US012693274B2

(12) United States Patent
Wang et al.

(10) Patent No.: US 12,693,274 B2
(45) Date of Patent: Jul. 28, 2026

(54) PLATFORM FOR NATIVE LIQUID CHROMATOGRAPHY-MASS SPECTROMETRY

(71) Applicant: Regeneron Pharmaceuticals, Inc., Tarrytown, NY (US)

(72) Inventors: Shunhai Wang, Scarsdale, NY (US); Yuetian Yan, Chappaqua, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 504 days.

(21) Appl. No.: 18/104,669

(22) Filed: Feb. 1, 2023

(65) Prior Publication Data

US 2023/0266286 A1     Aug. 24, 2023

Related U.S. Application Data

(63) Continuation of application No. 17/162,618, filed on Jan. 29, 2021, now Pat. No. 11,598,756.

(60) Provisional application No. 63/041,348, filed on Jun. 19, 2020, provisional application No. 62/967,836, filed on Jan. 30, 2020.

(51) Int. Cl.
G01N 30/72 (2006.01)
G01N 30/38 (2006.01)
G01N 30/02 (2006.01)

(52) U.S. Cl.
CPC ......... G01N 30/7266 (2013.01); G01N 30/38 (2013.01); G01N 30/7273 (2013.01); *G01N 2030/027* (2013.01)

(58) Field of Classification Search
CPC .............. G01N 30/7266; G01N 30/38; G01N 30/7273; G01N 2030/027; G01N 30/84; G01N 2030/8429; H01J 49/167
See application file for complete search history.

(56) References Cited

U.S. PATENT DOCUMENTS 5,235,186 A * 8/1993 Robins ............... G01N 30/7266
                                                            250/281
6,297,499 B1 * 10/2001 Fenn ................... H01J 49/0436
                                                            250/288
11,598,756 B2    3/2023 Wang et al.
                (Continued)

OTHER PUBLICATIONS

Belov et al., From Protein Complexes to Subunit Backbone Fragments: A Multi-stage Approach to Native Mass Spectrometry, Anal. Chem. 2013, 85, 23, pp. 11163-11173 (Year: 2013).*
(Continued)

*Primary Examiner* — David J Bolduc
(74) *Attorney, Agent, or Firm* — Schwabe, Williamson & Wyatt PC; Angela Guo

(57) ABSTRACT

Disclosed are native liquid chromatography-mass spectrometry systems and methods of use. A native liquid chromatography-mass spectrometry system can include a liquid chromatography system capable of separating a sample; and an electrospray ionization mass spectrometry (ESI-MS) system in fluid communication with the liquid chromatography system, wherein the ESI-MS system comprises a multi-nozzle electrospray ionization emitter and a system for modifying a desolvation gas and a mass spectrometer, wherein the mass spectrometer is configured to receive ions and characterize mass to charge ratio of ions.

19 Claims, 28 Drawing Sheets

(56)　　　References Cited

U.S. PATENT DOCUMENTS

| | | | | |
|---|---|---|---|---|
| 2004/0033591 A1* | 2/2004 | Lubman | C07K 1/285 | 702/19 |
| 2004/0036019 A1* | 2/2004 | Goodley | H01J 49/0018 | 250/288 |
| 2005/0258359 A1* | 11/2005 | Guevremont | H01J 49/0018 | 250/288 |
| 2009/0250608 A1* | 10/2009 | Mordehai | H01J 49/167 | 250/288 |
| 2010/0001181 A1* | 1/2010 | Moini | G01N 30/7266 | 250/281 |
| 2010/0102218 A1* | 4/2010 | Rahbar | A61K 31/195 | 250/282 |
| 2011/0101122 A1* | 5/2011 | Oleschuk | H01J 49/167 | 239/3 |
| 2011/0147576 A1* | 6/2011 | Wouters | H01J 49/167 | 250/288 |
| 2011/0192968 A1* | 8/2011 | Makarov | H01J 49/167 | 250/288 |
| 2012/0104248 A1* | 5/2012 | Hardman | H01J 49/167 | 250/288 |
| 2014/0110661 A1* | 4/2014 | Wang | H10N 99/00 | 438/20 |
| 2014/0291544 A1* | 10/2014 | Hardman | H01J 49/107 | 250/423 R |
| 2016/0217994 A1 | 7/2016 | Oleschuk et al. | | |
| 2017/0003294 A1* | 1/2017 | Wang | G01N 33/723 | |
| 2018/0338939 A1* | 11/2018 | Rahbar | A61P 3/10 | |
| 2018/0348179 A1* | 12/2018 | Staats | G01N 30/6078 | |
| 2019/0006165 A1* | 1/2019 | Corr | H01J 49/165 | |
| 2019/0300617 A1* | 10/2019 | Lawson | A61P 25/06 | |
| 2020/0191795 A1* | 6/2020 | Wang | G01N 33/6848 | |
| 2020/0363381 A1* | 11/2020 | Rahbar | G01N 33/4833 | |
| 2020/0378989 A1* | 12/2020 | Bajic | H01J 49/045 | |
| 2021/0231560 A1* | 7/2021 | Wu | G01N 30/02 | |
| 2021/0255075 A1* | 8/2021 | Ren | G01N 30/00 | |

OTHER PUBLICATIONS

WIPO Application No. PCT/US2021/015800, PCT International Search Report and Written Opinion of the International Searching Authority mailed May 12, 2021.

Gargano et al., "Capillary HILIC-MS: A New Tool for Sensitive Top-Down Proteomics," Analytical Chemistry, vol. 90 No. 11: 6601-6609, (May 3, 2018). [XP055689272, ISSN: 0003-2700, DOI: 10.1021/acs.analchem.8b00382].

Pan et al., "Microflow LC-Nanospray MS for Targeted Proteomics," Appication Note Newomics Inc, (2019) [XP055800640, retreived from internet: URL:https://www.newomics.com on May 3, 2021].

Silveira et al., "Sensitivity Improvement for Bottom-up Proteomics using Silicon Microfluidic Chip-Based Multinozzle Emitter Arrays at Capillary Flow Rates," 66th ASMS Conference on Mass Spectrometry and Allied Topics Jun. 3-7, 2018, San Diego, CA, (2018) [XP055800650, retreived from the internet: URL:https://assets. thermofisher.com/TFS-Assets/CMD/posters/po-65308-lc-ms-capillary-flow-sensitivity-proteomics-asms2018-po65308-en.pdff on May 3, 2021].

U.S. Appl. No. 17/162,618, Non-Final Office Action mailed Jun. 14, 2022.

U.S. Appl. No. 17/162,618, Notice of Allowance mailed Nov. 2, 2022.

Wang et al., "Simple Approach for Improved LC-MS Analysis of Protein Biopharmaceuticals via Modification of Desolvation Gas," Analytical Chemistry, vol. 91 No. 4: 316-3162, (2019). [XP055689293, ISSN: 0003-2700, DOI: 10.1021/acs.analchem.8b05846].

Yan et al., "Coupling Mixed-Mode Size Exclusion Chromatography with Native Mass Spectrometry for Sensitive Detection and Quantitation of Homodimer Impurities in Bispecific IgG," Analytical Chemistry, vol. 91 No. 17: 11417-11424, (2019). [XP055658983, ISSN: 0003-2700, DOI: 10.1021/acs.analchem.9b02793].

Yan et al., "Versatile, Sensitive, and Robust Native LC-MS Platform for Intact Mass Analysis of Protein Drugs," Journal of the American Society for Mass Spectrometry, vol. 31 No. 10: 2171-2179, (2020). [XP055799797, ISSN: 1044-0305, DOI: 10.1021/jasms.0c00277 retreived from the internet: URL:https://pubs.acs.org/doi/pdf/10. 1021/jasms.0c00277].

\* cited by examiner

Desolvation Gas

| nLC-MS assay | TIC/UV Peaks | Proposed Identity | Relative Abundance |
|---|---|---|---|
| nSEC-MS | HMW1 | NISTmAb dimer | 0.1% |
| | HMW2 | NISTmAb dimer | 1.3% |
| | Main | NISTmAb | 98.2% |
| | LMW1 | NISTmAb-Fab [LC+HC(1-223/227)] | 0.4% |
| | LMW2 | Fab [LC+HC(1-222~228)] | 0.02% |
| | a | Fab [LC+HC(1-224)] | 0.05% |
| | b | NISTmAb-Fab [LC+HC(1-227)] | 0.07% |
| | c | Fab [LC+HC(1-223)] & Fab [LC+HC(1-225)] | 0.04% |
| | d | NISTmAb-Fab [LC+HC(1-223)] | 0.06% |
| | e | Fab [LC+HC(1-227)] & Fab [LC+HC(1-228)] | 0.13% |
| | f | Fab [LC+HC(1-222)] | |
| nIEX-MS | Acidic 1 | NISTmAb+CML (carboxymethyl); NISTmAb+G3FS | 5.74% |
| | Acidic 2 | NISTmAb + deamidation NISTmAb + NeuGc | 6.43% |
| | Main | NISTmAb | 73.82% |
| | Basic 1 | NISTmAb + 1 unremoved C-term Lys | 9.12% |
| | Basic 2 | NISTmAb + 1 unconverted N-term Q; NISTmAb + 2 unremoved C-term Lys | 4.51% |

FIG. 18

PLATFORM FOR NATIVE LIQUID CHROMATOGRAPHY-MASS SPECTROMETRY

CROSS-REFERENCE TO RELATED APPLICATIONS

This application is a continuation of U.S. application Ser. No. 17/162,618, filed Jan. 29, 2021, which claims the benefit under 35 USC § 119(e) of U.S. Provisional Application Nos. 62/967,836, filed Jan. 30, 2020; and 63/041,348, filed Jun. 19, 2020, each of which is incorporated herein by reference in its entirety for all purposes.

FIELD OF THE INVENTION

The present invention pertains to a system and method of characterizing a protein, and in particular, to a native liquid chromatography-mass spectrometry (LC-MC) platform for protein characterization, such as protein biopharmaceuticals.

BACKGROUND

Electrospray ionization (ESI)-mass spectrometry (MS) coupled to chromatographic and electrophoretic separation techniques is a key technology in proteomics. It has become an important tool for in-depth characterization of protein biopharmaceuticals in analytical labs to support their developmental and regulatory filings. Protein biopharmaceuticals must meet very high standards of purity and hence it is important to monitor and characterize proteins during different stages of drug development and production.

Liquid chromatography-mass spectrometry (LC-MS)-based analysis of protein biopharmaceuticals could benefit tremendously from improved data quality, which can subsequently lead to improved drug characterization with higher confidence and less ambiguity. To provide characterization of different protein attributes, a wide variety of LC-MS-based assays can be performed, within which peptide mapping analysis and intact mass analysis are most routinely and widely applied. To improve the confidence of the analysis and reduce the ambiguity associated with data interpretation, constant efforts need to be made to improve the data quality from the LC-MS analysis, including using optimized experimental procedures, fine-tuned instrument parameters as well as more advanced mass spectrometers.

BRIEF SUMMARY OF THE INVENTION

In one aspect, the present invention provides a native liquid chromatography-mass spectrometry system, comprising: a liquid chromatography system capable of separating a sample; and an electrospray ionization mass spectrometry (ESI-MS) system in fluid communication with the liquid chromatography system, wherein the ESI-MS system comprises a multi-nozzle electrospray ionization emitter, a system for modifying a desolvation gas, and a mass spectrometer, wherein the mass spectrometer is configured to receive ions and characterize mass to charge ratio of ions.

In some embodiments, the system for modifying a desolvation gas comprises a container having a cap, wherein the cap has an inlet line port and an outlet line port; a sheath gas inlet line for providing a sheath gas to the inlet line port; and a modified desolvation gas outlet line capable of connecting the modified desolvation gas outlet line port to the multi-nozzle electrospray ionization emitter.

In some embodiments, the container comprises an organic solvent and an additional chemical component.

In some embodiments, the additional chemical component is an acid.

In some embodiments, the acid is trifluoroacetic acid.

In some embodiments, the additional chemical component is a base.

In some embodiments, the base is triethylamine.

In some embodiments, the organic solvent is acetonitrile.

In some embodiments, the sheath gas is nitrogen.

In some embodiments, the sheath gas inlet line is partially inserted into to the inlet line port.

In some embodiments, the modified desolvation gas outlet line is partially inserted into to the outlet line port.

In some embodiments, the sheath gas flows from the sheath gas inlet line through the container containing an organic solvent into the desolvation gas outlet line.

In some embodiments, the multi-nozzle electrospray ionization emitter includes eight nozzles.

In some embodiments, the liquid chromatography system comprises a size exclusion chromatography (SEC) column.

In some embodiments, the liquid chromatography system comprises an ion exchange chromatography (IEX) column.

In some embodiments, the liquid chromatography-mass spectrometry system further comprises an analytical flow splitter for adjusting flow rate from the liquid chromatograph to the mass spectrometer.

In some embodiments, the analytical flow splitter is capable of providing an electrospray with a solvent flow rate of about 1 to 5 μL/min.

In some embodiments, the mass spectrometer comprises an orbitrap mass analyzer.

In some embodiments, a method of characterizing a protein in a sample is disclosed, comprising: supplying the sample to a liquid chromatography system capable of sample separation and fragmentation; and analyzing the fragmented sample by use of an electrospray ionization mass spectrometry (ESI-MS) system in fluid communication with the liquid chromatography system, wherein the ESI-MS system comprises a multi-nozzle electrospray ionization emitter, a system for modifying a desolvation gas, and a mass spectrometer, wherein the mass spectrometer is configured to receive ions and characterize mass to charge ratio of ions to identify the components of the protein to characterize the protein.

In some embodiments, the protein is an antibody, a fusion protein, recombinant protein, or a combination thereof.

In some embodiments, the antibody is a monoclonal antibody.

In some embodiments, the monoclonal antibody of isotype IgG1, IgG2, IgG3, IgG4, or mixed isotype.

In some embodiments, the method does not require deglycosylation of the protein in the sample prior to supplying the sample to the liquid chromatography system.

In some embodiments, the method is for characterizing high molecular weight and low molecular weight impurities.

In some embodiments of the method, the system for modifying a desolvation gas comprises a container having a cap, wherein the cap has an inlet line port and an outlet line port; a sheath gas inlet line for providing a sheath gas to the inlet line port; and a modified desolvation gas outlet line capable of connecting the modified desolvation gas outlet line port to the multi-nozzle electrospray ionization emitter.

In some embodiments of the method, the container comprises an organic solvent and an additional chemical component.

In some embodiments of the method, the additional chemical component is an acid.

In some embodiments of the method, the acid is trifluoroacetic acid.

In some embodiments of the method, the additional chemical component is a base.

In some embodiments of the method, the base is triethylamine.

In some embodiments of the method, the organic solvent is acetonitrile.

In some embodiments of the method, the sheath gas is nitrogen.

In some embodiments of the method, the sheath gas inlet line is partially inserted into to the inlet line port.

In some embodiments of the method, the modified desolvation gas outlet line is partially inserted into to the outlet line port.

In some embodiments of the method, the sheath gas flows from the sheath gas inlet line through the container containing an organic solvent into the desolvation gas outlet line.

In some embodiments of the method, the multi-nozzle electrospray ionization emitter includes eight nozzles.

In some embodiments of the method, the liquid chromatography system comprises a size exclusion chromatography (SEC) column.

In some embodiments of the method, the liquid chromatography system comprises an ion exchange chromatography (IEX) column.

In some embodiments of the method, the method further comprises using an analytical flow splitter for adjusting flow rate from the liquid chromatograph to the mass spectrometer.

In some embodiments of the method, the analytical flow splitter is capable of providing an electrospray with a solvent flow rate of about 1 to 5 µL/min.

In some embodiments of the method, the mass spectrometer comprises an orbitrap mass analyzer.

In various embodiments, any of the features or components of embodiments discussed above or herein may be combined, and such combinations are encompassed within the scope of the present disclosure. Any specific value discussed above or herein may be combined with another related value discussed above or herein to recite a range with the values representing the upper and lower ends of the range, and such ranges and all values falling within such ranges are encompassed within the scope of the present disclosure. Each of the values discussed above or herein may be expressed with a variation of 1%, 5%, 10% or 20%. For example, a concentration of 10 mM may be expressed as 10 mM±0.1 mM (1% variation), 10 mM±0.5 mM (5% variation), 10 mM±1 mM (10% variation) or 10 mM±2 mM (20% variation). Other embodiments will become apparent from a review of the ensuing detailed description.

DESCRIPTION OF THE FIGURES

FIG. 5A illustrates slight TIC intensity drop associated with charge reduction. FIG. 5B shows charge reduction effect demonstrated by antibody B.

FIG. 9A is a comparison of MS signal intensity (left y-axis) and mass accuracy (right y-axis) achieved using 150, 300, 450, and 600 mM of ammonium acetate as mobile phase (triplicate analysis each). FIG. 9B is an example of the raw mass spectrum of mAb1 acquired using 600 mM of ammonium acetate, showing successful detection of different glycoforms, resulting from the macro- and microheterogeneity of Fc N-glycosylation.

FIGS. 16-1 and 16-2 show native SCX-MS analysis of NISTmAb with injection amount of 10 µg.

5

Figure 17:
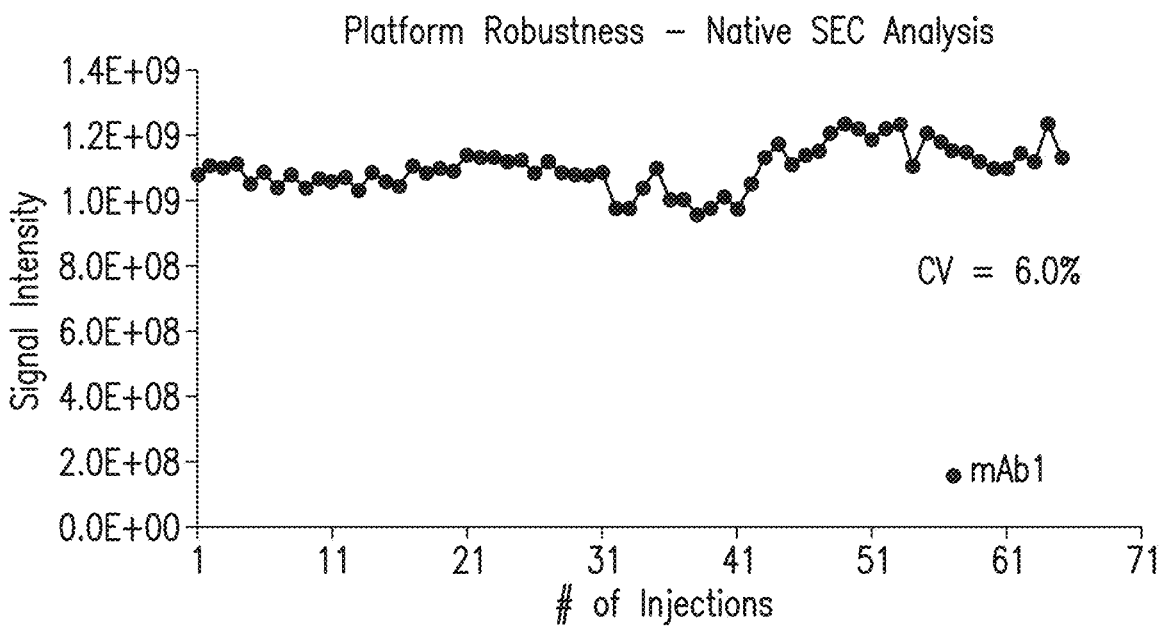
Figure 17:
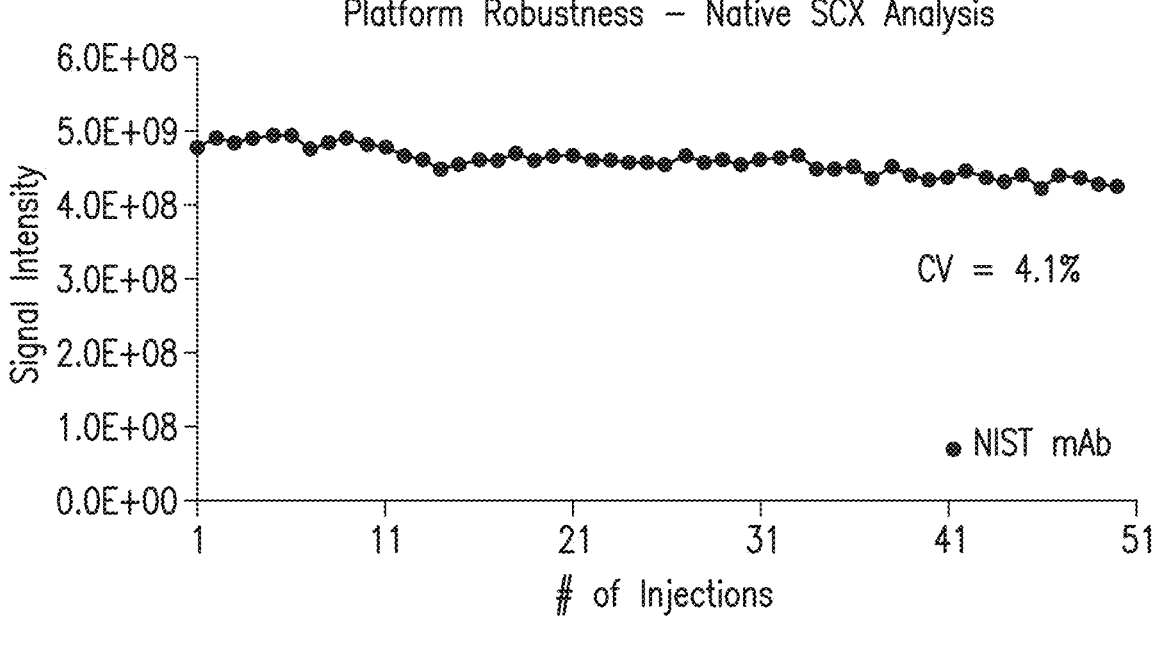

FIG. 17 shows evaluation of the robustness of the native LC-MS platform by performing continuous analysis using nSEC-MS (top, 24 min duty cycle) or nIEX-MS (bottom, 30 min duty cycle) for >24 hours each.

FIG. 18 shows a summary of size and charge variants detected from nSEC-MS and nIEX-MS analyses of 10 μg of NISTmAb reference standard sample.

DETAILED DESCRIPTION OF THE INVENTION

Before the present invention is described, it is to be understood that this invention is not limited to particular methods and experimental conditions described, as such methods and conditions may vary. It is also to be understood that the terminology used herein is for the purpose of describing particular embodiments only, and is not intended to be limiting, since the scope of the present invention will be limited only by the appended claims. Any embodiments or features of embodiments can be combined with one another, and such combinations are expressly encompassed within the scope of the present invention.

Unless defined otherwise, all technical and scientific terms used herein have the same meaning as commonly understood by one of ordinary skill in the art to which this invention belongs. As used herein, the term "about," when used in reference to a particular recited numerical value, means that the value may vary from the recited value by no more than 1%. For example, as used herein, the expression "about 100" includes 99 and 101 and all values in between (e.g., 99.1, 99.2, 99.3, 99.4, etc.).

As used herein, the terms "include," "includes," and "including," are meant to be non-limiting and are understood to mean "comprise," "comprises," and "comprising," respectively.

Although any methods and materials similar or equivalent to those described herein can be used in the practice or testing of the present invention, the preferred methods and materials are now described. All patents, applications and non-patent publications mentioned in this specification are incorporated herein by reference in their entireties.

Abbreviations Used Herein

ACN: Acetonitrile
Asn: Asparagine
CQA: Critical Quality Attributes
CV: Coefficient of Variations
EIC: Extracted Ion Chromatograph
ESI-MS: Electrospray Ionization Mass Spectrometry
FA: Formic Acid
FDA: Food and Drug Administration
FG: Fully Glycosylated
FLR: Fluorescent Detection
HBA: 4-hydroxybenzoic acid
HC: Heavy Chain
HIC: Hydrophobic Interaction Chromatography
HILIC: Hydrophilic Interaction Liquid Chromatography
HMW: High Molecular Weight
IEX: Ion Exchange Chromatography
IgG: Immunoglobulin G
IPA: Isopropanol
LC: Light Chain
LC-MS: Liquid Chromatography-Mass Spectrometry
LMW: Low Molecular Weight
mAb: Monoclonal Antibody
MS: Mass Spectrometry

6

MW: Molecular Weight
NCE: Normalized Collision Energy
NG: non-glycosylated
nLC: Native Liquid Chromatography
PA: Propionic Acid
PG: partially glycosylated
PK: Pharmacokinetics
PQA: Product Quality Attribute
PTM: Post-translational Modification
RP-LC: Reversed Phase Liquid Chromatography
SPE: Solid Phase Extraction
SEC: Size Exclusion Chromatography
TCEP-HCl: Tris (2-carboxyethyl) Phosphine Hydrochloride
TFA: Trifluoroacetic Acid
TMT: Tandem Mass Tag
UV: Ultraviolet

Definitions

As used herein, the term "protein" includes any amino acid polymer having covalently linked amide bonds. Proteins comprise one or more amino acid polymer chains, generally known in the art as "polypeptides." "Polypeptide" refers to a polymer composed of amino acid residues, related naturally occurring structural variants, and synthetic non-naturally occurring analogs thereof linked via peptide bonds, related naturally occurring structural variants, and synthetic non-naturally occurring analogs thereof. "Synthetic peptides or polypeptides' refers to a non-naturally occurring peptide or polypeptide. Synthetic peptides or polypeptides can be synthesized, for example, using an automated polypeptide synthesizer. Various solid phase peptide synthesis methods are known to those of skill in the art. A protein may contain one or multiple polypeptides to form a single functioning biomolecule. A protein can include any of bio-therapeutic proteins, recombinant proteins used in research or therapy, trap proteins and other chimeric receptor Fc-fusion proteins, chimeric proteins, antibodies, monoclonal antibodies, polyclonal antibodies, human antibodies, and bispecific antibodies. In another exemplary aspect, a protein can include antibody fragments, nanobodies, recombinant antibody chimeras, cytokines, chemokines, peptide hormones, and the like. Proteins may be produced using recombinant cell-based production systems, such as the insect bacculovirus system, yeast systems (e.g., *Pichia* sp.), mammalian systems (e.g., CHO cells and CHO derivatives like CHO-K1 cells). For a recent review discussing biotherapeutic proteins and their production, see Ghaderi et al., "Production platforms for biotherapeutic glycoproteins. Occurrence, impact, and challenges of non-human sialylation," (Biotechnol. Genet. Eng. Rev. (2012) 147-75). In some embodiments, proteins comprise modifications, adducts, and other covalently linked moieties. Those modifications, adducts and moieties include for example avidin, streptavidin, biotin, glycans (e.g., N-acetylgalactosamine, galactose, neuraminic acid, N-acetylglucosamine, fucose, mannose, and other monosaccharides), PEG, polyhistidine, FLAGtag, maltose binding protein (MBP), chitin binding protein (CBP), glutathione-S-transferase (GST) myc-epitope, fluorescent labels and other dyes, and the like. Proteins can be classified on the basis of compositions and solubility and can thus include simple proteins, such as, globular proteins and fibrous proteins; conjugated proteins, such as, nucleoproteins, glycoproteins, mucoproteins, chromoproteins, phosphoproteins, metalloproteins, and lipoproteins; and derived proteins, such as, primary derived proteins and secondary derived proteins.

Variant protein" or "protein variant", or "variant" as used herein can include a protein that differs from a target protein by virtue of at least one amino acid modification. Protein variant may refer to the protein itself, a composition comprising the protein, or the amino sequence that encodes it. Preferably, the protein variant has at least one amino acid modification compared to the parent protein, e.g. from about one to about ten amino acid modifications, and preferably from about one to about five amino acid modifications compared to the parent. The protein variant sequence herein will preferably possess at least about 80% homology with a parent protein sequence, and most preferably at least about 90% homology, more preferably at least about 95% homology. In some exemplary embodiments, the protein can be an antibody, a bispecific antibody, a multispecific antibody, antibody fragment, monoclonal antibody, or combinations thereof.

The term "antibody", as used herein, is intended to refer to immunoglobulin molecules comprised of four polypeptide chains, two heavy (H) chains and two light (L) chains inter-connected by disulfide bonds (i.e., "full antibody molecules"), as well as multimers thereof (e.g. IgM) or antigen-binding fragments thereof. Each heavy chain is comprised of a heavy chain variable region ("HCVR" or "$V_H$") and a heavy chain constant region (comprised of domains $C_H1$, $C_H2$ and $C_H3$). In various embodiments, the heavy chain may be an IgG isotype. In some cases, the heavy chain is selected from IgG1, IgG2, IgG3 or IgG4. In some embodiments, the heavy chain is of isotype IgG1 or IgG4, optionally including a chimeric hinge region of isotype IgG1/IgG2 or IgG4/IgG2. Each light chain is comprised of a light chain variable region ("LCVR or "$V_L$") and a light chain constant region ($C_L$). The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. The term "antibody" includes reference to both glycosylated and non-glycosylated immunoglobulins of any isotype or subclass. The term "antibody" includes antibody molecules prepared, expressed, created or isolated by recombinant means, such as antibodies isolated from a host cell transfected to express the antibody. For a review on antibody structure, see Lefranc et al., *IMGT unique numbering for immunoglobulin and T cell receptor variable domains and Ig superfamily V-like domains,* 27(1) *Dev. Comp. Immunol.* 55-77 (2003); and M. Potter, *Structural correlates of immunoglobulin diversity,* 2(1) Surv. Immunol. Res. 27-42 (1983).

The term antibody also encompasses "bispecific antibody", which includes a heterotetrameric immunoglobulin that can bind to more than one different epitope. One half of the bispecific antibody, which includes a single heavy chain and a single light chain and six CDRs, binds to one antigen or epitope, and the other half of the antibody binds to a different antigen or epitope. In some cases, the bispecific antibody can bind the same antigen, but at different epitopes or non-overlapping epitopes. In some cases, both halves of the bispecific antibody have identical light chains while retaining dual specificity. Bispecific antibodies are described generally in U.S. Patent App. Pub. No. 2010/0331527 (Dec. 30, 2010).

The term "antigen-binding portion" of an antibody (or "antibody fragment"), refers to one or more fragments of an antibody that retain the ability to specifically bind to an antigen. Examples of binding fragments encompassed within the term "antigen-binding portion" of an antibody include (i) a Fab fragment, a monovalent fragment consisting of the VL, VH, CL and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a dAb fragment (Ward et al. (1989) Nature 241:544-546), which consists of a VH domain, (vi) an isolated CDR, and (vii) an scFv, which consists of the two domains of the Fv fragment, VL and VH, joined by a synthetic linker to form a single protein chain in which the VL and VH regions pair to form monovalent molecules. Other forms of single chain antibodies, such as diabodies are also encompassed under the term "antibody" (see e.g., Holliger et al. (1993) 90 PNAS U.S.A. 6444-6448; and Poljak et al. (1994) 2 Structure 1121-1123).

Moreover, antibodies and antigen-binding fragments thereof can be obtained using standard recombinant DNA techniques commonly known in the art (see Sambrook et al., 1989). Methods for generating human antibodies in transgenic mice are also known in the art. For example, using VELOCIMMUNE® technology (see, for example, U.S. Pat. No. 6,596,541, Regeneron Pharmaceuticals, VELOCIMMUNE®) or any other known method for generating monoclonal antibodies, high affinity chimeric antibodies to a desired antigen are initially isolated having a human variable region and a mouse constant region. The VELOCIMMUNE® technology involves generation of a transgenic mouse having a genome comprising human heavy and light chain variable regions operably linked to endogenous mouse constant region loci such that the mouse produces an antibody comprising a human variable region and a mouse constant region in response to antigenic stimulation. The DNA encoding the variable regions of the heavy and light chains of the antibody are isolated and operably linked to DNA encoding the human heavy and light chain constant regions. The DNA is then expressed in a cell capable of expressing the fully human antibody The term "human antibody", is intended to include antibodies having variable and constant regions derived from human germline immunoglobulin sequences. The human mAbs of the invention may include amino acid residues not encoded by human germline immunoglobulin sequences (e.g., mutations introduced by random or site-specific mutagenesis in vitro or by somatic mutation in vivo), for example in the CDRs and in particular CDR3. However, the term "human antibody", as used herein, is not intended to include mAbs in which CDR sequences derived from the germline of another mammalian species (e.g., mouse), have been grafted onto human FR sequences. The term includes antibodies recombinantly produced in a non-human mammal, or in cells of a non-human mammal. The term is not intended to include antibodies isolated from or generated in a human subject.

As used herein, the term "subject" refers to an animal, preferably a mammal, more preferably a human, for example in need of amelioration, prevention and/or treatment of a disease or disorder.

As used herein, the term "impurity" can include any undesirable protein present in the biopharmaceutical product. Impurity can include process and product-related impurities. The impurity can further be of known structure, partially characterized, or unidentified. Process-related impurities can be derived from the manufacturing process and can include the three major categories: cell substrate-derived, cell culture-derived and downstream derived. Cell substrate-derived impurities include, but are not limited to, proteins derived from the host organism and nucleic acid (host cell genomic, vector, or total DNA). Cell culture-derived impurities include, but are not limited to, inducers, antibiotics, serum, and other media components. Downstream-derived impurities include, but are not limited to, enzymes, chemical and biochemical processing reagents (e.g., cyanogen bromide, guanidine, oxidizing and reducing agents), inorganic salts (e.g., heavy metals, arsenic, nonmetallic ion), solvents, carriers, ligands (e.g., monoclonal antibodies), and other leachables. Product-related impurities (e.g., precursors, certain degradation products) can be molecular variants arising during manufacture and/or storage that do not have properties comparable to those of the desired product with respect to activity, efficacy, and safety. Such variants may need considerable effort in isolation and characterization in order to identify the type of modification(s). Product-related impurities can include truncated forms, modified forms, and aggregates. Truncated forms are formed by hydrolytic enzymes or chemicals which catalyze the cleavage of peptide bonds. Modified forms include, but are not limited to, deamidated, isomerized, mismatched S—S linked, oxidized, or altered conjugated forms (e.g., glycosylation, phosphorylation). Modified forms can also include any post-translational modification form. Aggregates include dimers and higher multiples of the desired product (Q6B Specifications: Test Procedures and Acceptance Criteria for Biotechnological/Biological Products, ICH August 1999, U.S. Dept. of Health and Humans Services).

The term "low molecular weight (LMVV) protein drug impurity" includes but is not limited to precursors, degradation products, truncated species, proteolytic fragments including Fab fragments, Fc or heavy chain fragments, ligand or receptor fragments, H2L (2 heavy chains and 1 light chain), H2 (2 heavy chains), HL (1 heavy chain and 1 light chain), HC (1 heavy chain), and LC (1 light chain) species. A LMW protein drug impurity can be any variant which is an incomplete version of the protein product, such as one or more components of a multimeric protein. Protein drug impurity, drug impurity or product impurity are terms that may be used interchangeably throughout the specification. LMW drug or product impurities are generally considered molecular variants with properties such as activity, efficacy, and safety that may be different from those of the desired drug product.

Degradation of protein product is problematic during production of the protein drug product in cell culture systems. For example, proteolysis of a protein product may occur due to release of proteases in cell culture medium. Medium additives, such as soluble iron sources added to inhibit metalloproteases, or serine and cysteine proteases inhibitors, have been implemented in cell culture to prevent degradation (Clincke, M.-F., et al, BMC Proc. 2011, 5, P115). C-terminal fragments may be cleaved during production due to carboxyl peptidases in the cell culture (Dick, L W et al, Biotechnol Bioeng 2008; 100:1132-43).

The term "high molecular weight (HMW) protein drug impurity" includes but is not limited to mAb trimers and mAb dimers. HMW species can be divided into two groups: 1) monomer with extra light chains (H2L3 and H2L4 species) and 2) monomer plus Fab fragments complexes. In addition, after treatment with IdeS enzymatic digestion, different dimerized fragments (Fab2-Fab2, Fc-Fc and Fab2-Fc) are formed.

A "post-translational modification" (PTM) refers to the covalent modification of proteins following protein biosynthesis. Post-translational modifications can occur on the amino acid side chains or at the protein's C- or N-termini. PTMs are generally introduced by specific enzymes or enzyme pathways. Many occur at the site of a specific characteristic protein sequence (e.g., signature sequence) within the protein backbone. Several hundred PTMs have been recorded, and these modifications invariably influence some aspect of a protein's structure or function (Walsh, G. "Proteins" (2014) second edition, published by Wiley and Sons, Ltd., ISBN: 9780470669853). The various post-translational modifications include, but are not limited to, cleavage, N-terminal extensions, protein degradation, acylation of the N-terminus, biotinylation (acylation of lysine residues with a biotin), amidation of the C-terminal, glycosylation, iodination, covalent attachment of prosthetic groups, acetylation (the addition of an acetyl group, usually at the N-terminus of the protein), alkylation (the addition of an alkyl group (e.g. methyl, ethyl, propyl) usually at lysine or arginine residues), methylation, adenylation, ADP-ribosylation, covalent cross links within, or between, polypeptide chains, sulfonation, prenylation, Vitamin C dependent modifications (proline and lysine hydroxylations and carboxy terminal amidation), Vitamin K dependent modification wherein Vitamin K is a cofactor in the carboxylation of glutamic acid residues resulting in the formation of a γ-carboxyglutamate (a glu residue), glutamylation (covalent linkage of glutamic acid residues), glycylation (covalent linkage glycine residues), glycosylation (addition of a glycosyl group to either asparagine, hydroxylysine, serine, or threonine, resulting in a glycoprotein), isoprenylation (addition of an isoprenoid group such as farnesol and geranylgeraniol), lipoylation (attachment of a lipoate functionality), phosphopantetheinylation (addition of a 4'-phosphopantetheinyl moiety from coenzyme A, as in fatty acid, polyketide, non-ribosomal peptide and leucine biosynthesis), phosphorylation (addition of a phosphate group, usually to serine, tyrosine, threonine or histidine), and sulfation (addition of a sulfate group, usually to a tyrosine residue). The post-translational modifications that change the chemical nature of amino acids include, but are not limited to, citrullination (e.g., the conversion of arginine to citrulline by deimination), and deamidation (e.g., the conversion of glutamine to glutamic acid or asparagine to aspartic acid). The post-translational modifications that involve structural changes include, but are not limited to, formation of disulfide bridges (covalent linkage of two cysteine amino acids) and proteolytic cleavage (cleavage of a protein at a peptide bond). Certain post-translational modifications involve the addition of other proteins or peptides, such as ISGylation (covalent linkage to the ISG15 protein (Interferon-Stimulated Gene)), SUMOylation (covalent linkage to the SUMO protein (Small Ubiquitin-related MOdifier)) and ubiquitination (covalent linkage to the protein ubiquitin). See www.uniprot.org/docs/ptmlist for a more detailed controlled vocabulary of PTMs curated by UniProt.

The term as used herein, "glycopeptide/glycoprotein" is a modified peptide/protein, during or after their synthesis, with covalently bonded carbohydrates or glycan. In certain embodiments, a glycopeptide is obtained from a monoclonal antibody, for example, from a protease digest of a monoclonal antibody.

The term as used herein, "glycan" is a compound comprising one or more of sugar units which commonly include glucose (Glc), galactose (Gal), mannose (Man), fucose (Fuc), N-acetylgalactosamine (GalNAc), N-acetylglucosamine (GlcNAc) and N-acetylneuraminic acid (Neu-NAc) (Frank Kjeldsen, et al. Anal. Chem. 2003, 75, 2355-2361). The glycan moiety in glycoprotein, such as a monoclonal antibody, is an important character to identify its function or cellular location. For example, a specific monoclonal antibody is modified with specific glycan moiety.

The term "sample," as used herein, refers to a mixture of molecules that comprises at least an analyte molecule, e.g., glycopeptide, such as obtained from a monoclonal antibody, that is subjected to manipulation in accordance with the methods of the invention, including, for example, separating, analyzing, extracting, concentrating or profiling.

The terms "analysis" or "analyzing," as used herein, are used interchangeably and refer to any of the various methods of separating, detecting, isolating, purifying, solubilizing, detecting and/or characterizing molecules of interest (e.g., peptides). Examples include, but are not limited to, solid phase extraction, solid phase micro extraction, electrophoresis, mass spectrometry, e.g., ESI-MS, SPE HILIC, or MALDI-MS, liquid chromatography, e.g., high performance, e.g., reverse phase, normal phase, or size exclusion, ion-pair liquid chromatography, liquid-liquid extraction, e.g., accelerated fluid extraction, supercritical fluid extraction, microwave-assisted extraction, membrane extraction, soxhlet extraction, precipitation, clarification, electrochemical detection, staining, elemental analysis, Edmund degradation, nuclear magnetic resonance, infrared analysis, flow injection analysis, capillary electrochromatography, ultraviolet detection, and combinations thereof.

The term "profiling," as used herein, refers to any of various methods of analysis which are used in combination to provide the content, composition, or characteristic ratio of proteins, such as a peptide in a sample.

"Contacting," as used herein, includes bringing together at least two substances in solution or solid phase.

"Intact mass analysis" as used herein includes top-down experiments wherein a protein is characterized as an intact protein. Intact mass analysis can reduce sample preparation to a minimum and preserve information that can sometimes get lost in other proteomics strategies, such as the connectivity of multiple PTMs.

"Peptide mapping analysis" as used herein includes experiments wherein the protein undergoes digestion followed by separation of the resulting peptides and their analysis, preferably using LC-MS. In some exemplary embodiments, peptide mapping analysis can be applied to confirm the primary sequence of protein biopharmaceuticals, where a protein molecule can be first hydrolyzed into small peptide fragments using a hydrolyzing agent and then the amino acid sequence of each peptide fragment is determined by LC-MS analysis taking into consideration of the cDNA predicted sequence and the specificity of the protease used. Data from peptide mapping analysis could also be utilized to identify and quantify post-translational modifications, confirm the disulfide bond linkages and even detect amino acid substitution events present at very low levels (<0.1%) (Zeck et al. PloS one 2012, 7, e40328). During peptide mapping analysis of protein biopharmaceuticals, LC-MS can be often performed in combination with ultraviolet (UV) detection to generate so-called UV fingerprints, which alone can be used as an identification assay during quality control (QC) and drug release.

As used herein, the term "digestion" refers to hydrolysis of one or more peptide bonds of a protein. There are several approaches to carrying out digestion of a protein in a sample using an appropriate hydrolyzing agent, for example, enzymatic digestion or non-enzymatic digestion. As used herein, the term "hydrolyzing agent" refers to any one or combination of a large number of different agents that can perform digestion of a protein. Non-limiting examples of hydrolyzing agents that can carry out enzymatic digestion include trypsin, endoproteinase Arg-C, endoproteinase Asp-N, endoproteinase Glu-C, outer membrane protease T (OmpT), immunoglobulin-degrading enzyme of *Streptococcus pyogenes* (IdeS), chymotrypsin, pepsin, thermolysin, papain, pronase, and protease from *Aspergillus saitoi*. Non-limiting examples of hydrolyzing agents that can carry out non-enzymatic digestion include the use of high temperature, microwave, ultrasound, high pressure, infrared, solvents (non-limiting examples are ethanol and acetonitrile), immobilized enzyme digestion (IMER), magnetic particle immobilized enzymes, and on-chip immobilized enzymes. For a recent review discussing the available techniques for protein digestion see Switazar et al., "Protein Digestion: An Overview of the Available Techniques and Recent Developments" (J. Proteome Research 2013, 12, 1067-1077). One or a combination of hydrolyzing agents can cleave peptide bonds in a protein or polypeptide, in a sequence-specific manner, generating a predictable collection of shorter peptides.

Several approaches are available that can be used to digest a protein. One of the widely accepted methods for digestion of proteins in a sample involves the use of proteases. Many proteases are available and each of them has their own characteristics in terms of specificity, efficiency, and optimum digestion conditions. Proteases refer to both endopeptidases and exopeptidases, as classified based on the ability of the protease to cleave at non-terminal or terminal amino acids within a peptide. Alternatively, proteases also refer to the six distinct classes—aspartic, glutamic, and metalloproteases, cysteine, serine, and threonine proteases, as classified on the mechanism of catalysis. The terms "protease" and "peptidase" are used interchangeably to refer to enzymes which hydrolyze peptide bonds. Proteases can also be classified into specific and non-specific proteases. As used herein, the term "specific protease" refers to a protease with an ability to cleave the peptide substrate at a specific amino acid side chain of a peptide. As used herein, the term "non-specific protease" refers to a protease with a reduced ability to cleave the peptide substrate at a specific amino acid side chain of a peptide. A cleavage preference may be determined based on the ratio of the number of a particular amino acid as the site of cleavage to the total number of cleaved amino acids in the protein sequences.

The protein can optionally be prepared before characterizing. In some exemplary embodiments, the protein preparation includes a step of protein digestion. In some specific exemplary embodiments, the protein preparation includes a step of protein digestion, wherein the protein digestion can be carried out using trypsin.

In some exemplary embodiments, the protein preparation can include a step for denaturing the protein, reducing the protein, buffering the protein, and/or desalting the sample, before the step of protein digestion. These steps can be accomplished in any suitable manner as desired.

To provide characterization of different protein attributes using either peptide mapping analysis or intact mass analysis, a wide variety of LC-MS based assays can be performed.

As used herein, the term "liquid chromatography" refers to a process in which a chemical mixture carried by a liquid can be separated into components as a result of differential distribution of the chemical entities as they flow around or over a stationary liquid or solid phase. Non-limiting examples of liquid chromatography include reverse phase liquid chromatography, ion-exchange chromatography, size exclusion chromatography, affinity chromatography, and hydrophobic chromatography.

As used herein, the term "mass spectrometer" refers to a device capable of detecting specific molecular species and accurately measuring their masses. The term can be meant to include any molecular detector into which a polypeptide or peptide may be eluted for detection and/or characterization. A mass spectrometer consists of three major parts: the ion source, the mass analyzer, and the detector. The role of the ion source is to create gas phase ions. Analyte atoms, molecules, or clusters can be transferred into gas phase and ionized either concurrently (as in electrospray ionization). The choice of ion source depends on the application.

As used herein, the term "electrospray ionization" or "ESI" refers to the process of spray ionization in which either cations or anions in solution are transferred to the gas phase via formation and desolvation at atmospheric pressure of a stream of highly charged droplets that result from applying a potential difference between the tip of the electrospray emitter needle containing the solution and a counter electrode. There are three major steps in the production of gas-phase ions from electrolyte ions in solution. These are: (a) production of charged droplets at the ES infusion tip; (b) shrinkage of charged droplets by solvent evaporation and repeated droplet disintegrations leading to small highly charged droplets capable of producing gas-phase ions; and (c) the mechanism by which gas-phase ions are produced from very small and highly charged droplets. Stages (a)-(c) generally occur in the atmospheric pressure region of the apparatus.

As used herein, the term "electrospray ionization source" refers to an electrospray ionization system that can be compatible with a mass spectrometer used for mass analysis of protein.

Native MS is a particular approach based on electrospray ionization in which the biological analytes are sprayed from a nondenaturing solvent. It is defined as the process whereby biomolecules, such as large biomolecules, and complexes thereof can be transferred from a three-dimensional, functional existence in a condensed liquid phase to the gas phase via the process of electrospray ionization mass spectrometry (ESI-MS).

The term "nanoelectrospray" or "nanospray" as used herein refers to electrospray ionization at a very low solvent flow rate, typically hundreds of nanoliters per minute of sample solution or lower, often without the use of an external solvent delivery.

As used herein, "mass analyzer" refers to a device that can separate species, that is, atoms, molecules, or clusters, according to their mass. Non-limiting examples of mass analyzers that could be employed for fast protein sequencing are time-of-flight (TOF), magnetic/electric sector, quadrupole mass filter (Q), quadrupole ion trap (QIT), orbitrap, Fourier transform ion cyclotron resonance (FTICR), and also the technique of accelerator mass spectrometry (AMS).

As used herein, "mass-to-charge ratio" or "m/z" is used to denote the dimensionless quantity formed by dividing the mass of an ion in unified atomic mass units by its charge number (regardless of sign). In general, the charge state depends on: the method of ionization (as electrospray ionization, ESI tends to promote multiple ionization, which is not as frequent in MALDI), peptide length (as longer peptides have more groups where additional protons can be attached (basic residues)), peptide sequence (as some amino acids (e.g., Arg or Lys) are more susceptible to ionization than others), the instrument settings, solvent pH, and solvent composition.

As used herein, the term "tandem mass spectrometry" refers to a technique where structural information on sample molecules can be obtained by using multiple stages of mass selection and mass separation. A prerequisite is that the sample molecules can be transferred into gas phase and ionized intact and that they can be induced to fall apart in some predictable and controllable fashion after the first mass selection step. Multistage MS/MS, or MSn, can be performed by first selecting and isolating a precursor ion (MS2), fragmenting it, isolating a primary fragment ion (MS3), fragmenting it, isolating a secondary fragment (MS4), and so on as long as one can obtain meaningful information or the fragment ion signal is detectable. Tandem MS have been successfully performed with a wide variety of analyzer combinations. What analyzers to combine for a certain application can be determined by many different factors, such as sensitivity, selectivity, and speed, but also size, cost, and availability. The two major categories of tandem MS methods are tandem-in-space and tandem-in-time, but there are also hybrids where tandem-in-time analyzers are coupled in space or with tandem-in-space analyzers.

A tandem-in-space mass spectrometer comprise of an ion source, a precursor ion activation device, and at least two non-trapping mass analyzers. Specific m/z separation functions can be designed so that in one section of the instrument ions are selected, dissociated in an intermediate region, and the product ions are then transmitted to another analyzer for m/z separation and data acquisition.

In tandem-in-time mass spectrometer ions produced in the ion source can be trapped, isolated, fragmented, and m/z separated in the same physical device.

"Targeted mass spectrometry," as used herein, is a mass spectrometry technique that uses multiple stages of tandem mass spectrometry (MSn with n=2 or 3) for ions of specific mass (m/z), at specific time. The values of the m/z and time are defined in an inclusion list which is derived from a previous analysis.

As used herein, the term "quadrupole-Orbitrap hybrid mass spectrometer" refers to a hybrid system made by coupling a quadrupole mass spectrometer to an orbitrap mass analyzer. A tandem in-time experiment using the quadrupole-Orbitrap hybrid mass spectrometer begins with ejection of all ions except those within a selected, narrow m/z range from the quadrupole mass spectrometer. The selected ions can be inserted into orbitrap and fragmented most often by low-energy CID. Fragments within the m/z acceptance range of the trap should remain in the trap, and an MS-MS spectrum can be obtained. Similar hybrid systems can be used for fast protein sequencing, such as, but not limited to QIT-FTICR and Qq-FTICR.

As used herein, the term "protein de novo sequencing" refers to a procedure for determination of the amino acid sequence of a peptide without relying on the information gained from other sources. Due to the high level of sensitivity of mass spectrometry, this technique can provide vital information that is often beyond the capabilities of conventional sequencing methods.

As used herein, the term "protein sequence coverage" refers to the percentage of the protein sequence covered by identified peptides. The percent coverage can be calculated by dividing the number of amino acids in all found peptides by the total number of amino acids in the entire protein sequence.

As used herein, the term "database" refers to bioinformatic tools which provide the possibility of searching the uninterpreted MS-MS spectra against all possible sequences in the database(s). Non-limiting examples of such tools are Mascot (www.matrixscience.com), Spectrum Mill (www.chem.agilent.com), PLGS (www.waters.com), PEAKS (www.bioinformaticssolutions.com), Proteinpilot (download.appliedbiosystems.com//proteinpilot), Phenyx (www.phenyx-ms.com), Sorcerer (www.sagenresearch.com), OMSSA (www.pubchem.ncbi.nlm.nih.gov/omssa/), X!Tandem (www.thegpm.org/TANDEM/), Protein Prospector (www.prospector.ucsf.edu/prospector/mshome.htm), Byonic (www.proteinmetrics.com/products/byonic) or Sequest (fields.scripps.edu/sequest).

General Description

From the foregoing it will be appreciated that a need exists for improved methods and systems to improve protein characterization. The disclosed invention meets that need. Disclosed herein is a LC-MS platform with improved performance. In embodiments, a native LC-MS platform integrates an emitter with multiple nozzles and modification of the desolvation gas thereby producing a more robust platform.

Embodiments disclosed herein provide systems and methods for the rapid, high sensitivity characterization of proteins in a sample.

In some exemplary embodiments, the disclosure provides a liquid chromatography mass spectrometry system, comprising (i) liquid chromatography device, (iii) an electrospray ionization source, and (iii) a mass spectrometry device.

In some exemplary embodiments, this disclosure provides a modifier system 106, comprising (i) a container 110, (ii) a sheath gas inlet line 112, and (iii) a modified desolvation gas outlet line 114 which feeds into an electrospray ionization emitter with multiple nozzles 108. In some embodiments, the electrospray ionization emitter is a commercially available emitter, such as the M3 emitter (Newomics, Berkeley, CA).

In some exemplary embodiments, the disclosure provides a method of characterizing a protein in a sample, comprising (i) supplying the sample to an inlet of an electrospray ionization source, (ii) generating ions of components of the protein in the sample at an outlet of the electrospray ionization source, and (iii) analyzing the ions using a mass spectrometer to identify the components of the protein to characterize the protein.

Figure 1:
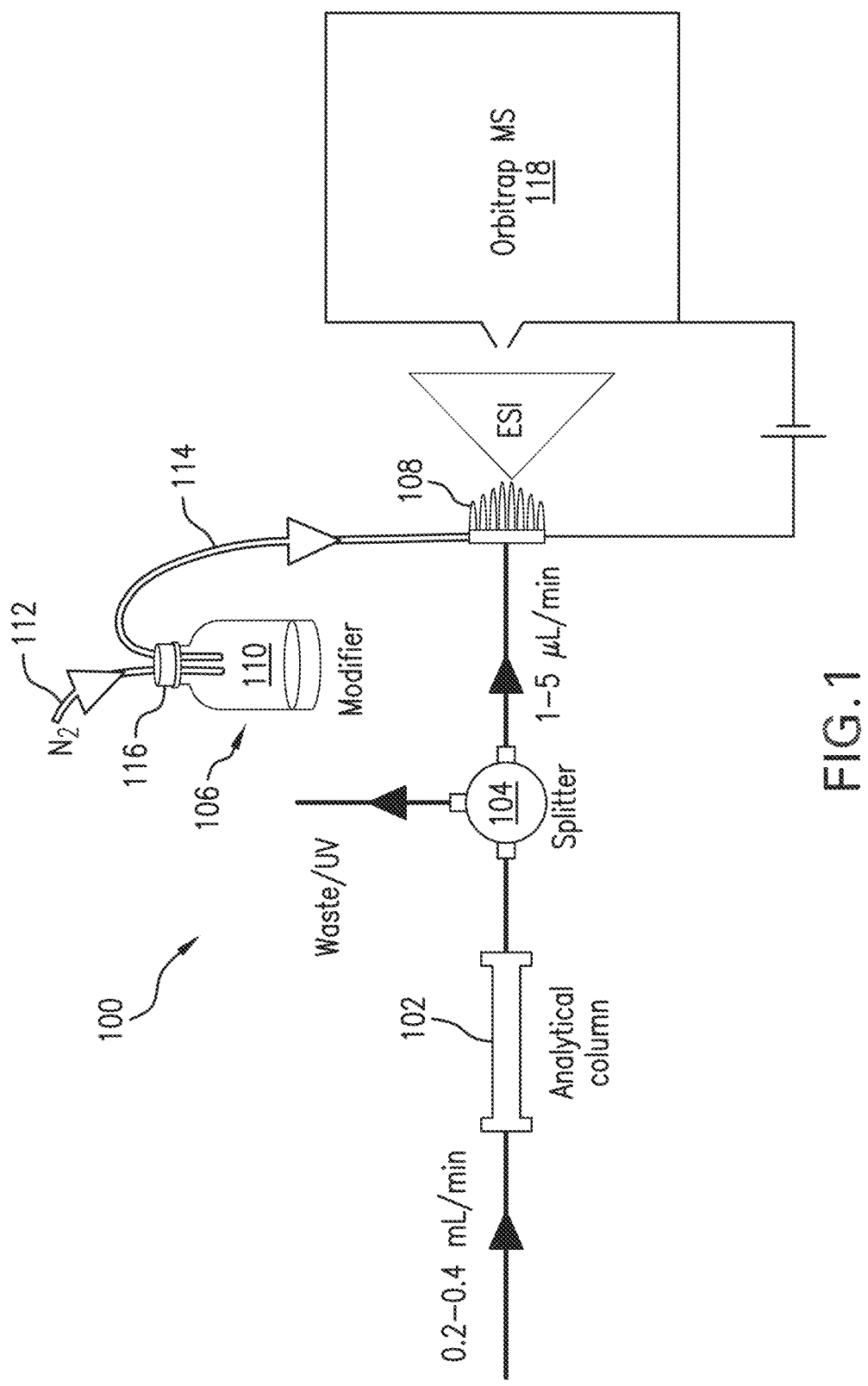
FIG. 1 shows a schematic of an exemplary embodiment of a native LC-MS platform disclosed herein which provides a sensitive, robust and versatile native LC-MS platform.

Referring to FIG. 1, an exemplary native LC-MS platform providing a robust signal is disclosed. As illustrated in FIG. 1, the native LC-MS platform 100 includes analytical column 102, splitter 104, modifier system 106, electrospray ionization emitter 108 and mass spectrometry device 118.

In embodiments, the analytical column 102 is a liquid chromatography (LC) separation column. Non-limiting examples of the liquid chromatography device can include reverse phase liquid chromatography, ion-exchange chromatography, size exclusion chromatography, affinity chromatography, hydrophilic-interaction chromatography, and hydrophobic chromatography. Liquid chromatography, including HPLC, can be used to analyze peptides, including monoclonal antibodies. Various forms of liquid chromatography can be used to study these structures, including anion-exchange chromatography, reversed-phase HPLC, size-exclusion chromatography, high-performance anion-exchange chromatography, and normal phase (NP) chromatography, including NP-HPLC (see, e.g., Alpert et al., J. Chromatogr. A 676:191-202 (1994)). Hydrophilic interaction chromatography (HILIC) is a variant of NP-HPLC that can be performed with partially aqueous mobile phases, permitting normal-phase separation of peptides, carbohydrates, nucleic acids, and many proteins. The elution order for HILIC is least polar to most polar, the opposite of that in reversed-phase HPLC. HPLC can be performed, e.g., on an HPLC system from Waters (e.g., Waters 2695 Alliance HPLC system), Agilent, Perkin Elmer, Gilson, etc.

In some embodiments, LC analysis is performed by using an ACQUITY UPLC peptide BEH C18 column. The column temperature can be maintained at a constant temperature throughout the chromatography run, e.g., using a commercial column heater. In some embodiments, the column is maintained at a temperature between about 18° C. to about 70° C., e.g., about 30° C. to about 60° C., about 40° C. to about 50° C., e.g., at about 20° C., about 25° C., about 30° C., about 35° C., about 40° C., about 45° C., about 50° C., about 55° C., about 60° C., about 65° C., or about 70° C. In some embodiments, the column temperature is about 40° C. In some embodiments, the run time can be between about 15 to about 240 minutes, e.g., about 20 to about 70 min, about 30 to about 60 min, about 40 to about 90 min, about 50 min to about 100 min, about 60 to about 120 min, about 50 to about 80 min.

In some embodiments, LC analysis includes a size exclusion chromatography (SEC) column, or an ion exchange chromatography (IEX) system in fluid communication with a native mass spectrometry system. The columns are suitable for use with deglycosylated proteins. In one embodiment, the SEC column is a Waters BEH® SEC column (4.6×300 mm). In one embodiment, the IEX column is a strong cation exchange column.

The column, such as a SEC or IEX column, is in fluid communication with the mass spectrometer via an analytical flow splitter 104 that can adjust the flow rate to mass spectrometer.

In some embodiments, the mobile phase is an aqueous mobile phase. A representative aqueous mobile phase contains 140 mM sodium acetate and 10 mM ammonium bicarbonate. The UV traces are typically recorded at 215 and 280 nm.

In some exemplary embodiments, the mobile phase used to elute the protein can be a mobile phase that can be compatible with a mass spectrometer.

In some exemplary embodiments, the mobile phase used in the liquid chromatography device can include water, acetonitrile, trifluoroacetic acid, formic acid, or combination thereof.

In some exemplary embodiments, the mobile phase can have a flow rate of about 0.1 ml/min to about 0.8 ml/min, such as between about 0.1 ml/min to about 0.4 ml/min, in the liquid chromatography device. In one aspect, the flow rate of the mobile phase in the liquid chromatography device can be about 0.1 ml/min, about 0.15 ml/min, about 0.20 ml/min, about 0.25 ml/min, about 0.30 ml/min, about 0.35 ml/min, about 0.4 ml/min, about 0.45 ml/min, about 0.50 ml/min, about 0.55 ml/min, about 0.60 ml/min, about 0.65 ml/min, about 0.70 ml/min, about 0.75 ml/min, or about 0.80 ml/min.

In some exemplary embodiments, the mobile phase can salt concentrations up to about 600 mM. In one aspect, the salt concentration is about 100 mM, about 150 mM, about 200 mM, 250 mM, about 300 mM, about 350 mM, about 400 mM, about 450 mM, about 500 mM, about 550 mM or about 600 mM.

It is understood that the system is not limited to any of the aforesaid protein, impurity, mobile phase, mass spectrometer, organic solvent, acid, base, or chromatographic column.

In one embodiment, the size exclusion separation is achieved at room temperature, using an isocratic flow of 0.2 mL/min for 24 minutes.

In one embodiment, the voltage for electrospray is applied through the liquid junction tee right before the emitter.

In some exemplary embodiments, as illustrated in FIG. 1, modifier system 106 includes container 110, sheath gas inlet line 112, sheath gas outlet line 114 and cap 116.

In some exemplary embodiments, the sheath gas inlet line 112 can be a Teflon tube.

In some exemplary embodiments, the sheath gas inlet line 112 can be flexible stainless steel tubing.

In some exemplary embodiments, the sheath gas inlet line 112 can be a tube made using poly ether ketone.

In some exemplary embodiments, the modified desolvation gas outlet line 114 can be a Teflon tube.

In some exemplary embodiments, the modified desolvation gas outlet line 114 can be flexible stainless steel tubing.

In some exemplary embodiments, the modified desolvation gas outlet line 114 can be a tube made using poly ether ketone.

In some exemplary embodiments, the container 110 can comprise a cap 116. The cap 116 can be safe to use with mobile phase.

In some exemplary embodiments, the container 110 can comprise a cap 116, wherein the cap 110 can be capable of forming an air-tight seal between the cap 116 and the container 110. Non-limiting example of caps that can be used include Analytical Sales' Canary-Safe Cap, Restek's Eco-cap bottle top, Restek's Opti-cap bottle top, and VWR's inert mobile phase bottle cap.

In some exemplary embodiments, the cap 116 can comprise of a screw cap.

In some exemplary embodiments, the cap 116 can be made of polytetrafluoroethylene (PTFE) material.

In some exemplary embodiments, the cap 116 can further comprise of an O-ring to ensure air-tight seal between cap and the container.

In some exemplary embodiments, the cap 116 in the container 110 can have at least one port for tubing. In one aspect, the cap 116 in the container 110 can have two ports for tubing.

In some exemplary embodiments, the cap 116 in the container can have at least one inlet port 160.

In some exemplary embodiments, the cap 116 in the container 110 can have at least one outlet port.

In some exemplary embodiments, the electrospray ionization emitter 108 is coupled to a sheath gas outlet line 114.

In some exemplary embodiments, the modifier system 106 can comprise a container 110 having a cap 116 with an inlet line port and an outlet line port and a sheath gas inlet line 112 capable of providing sheath gas to the inlet line port.

In some exemplary embodiments, the modifier system 106 can comprise a container 110 having a cap 116 with an inlet line port and an outlet line port and a modified desolvation gas outlet line 114 capable of connecting the outlet line port to an electrospray ionization emitter 108.

In some exemplary embodiments, the electrospray ionization emitter 108 comprises multiple emitter nozzles, such as at least two, at least three, at least four, at least five, at least six, at least seven, at least eight emitter nozzles, such as two, three, four, five, six, seven or eight emitter nozzles.

In some exemplary embodiments, the electrospray ionization emitter 108 is a M3 emitter from Newomics (Berkeley, CA) which includes 8 emitter nozzles.

In some exemplary embodiments, a sheath gas can be provided by a sheath gas source to a container 110 having a cap 116 with an inlet line port through a sheath gas inlet line 112. Non-limiting examples of sheath gas include air, nitrogen, IPA, ACN, and/or ACN/NH$_3$.

In some exemplary embodiments, the sheath gas that can be provided by a sheath gas source to a container having a cap with an inlet line port through a sheath gas inlet line 112 can be nitrogen gas.

In some exemplary embodiments, the electrospray ionization emitter 108 can be automated to carry out sample aspiration, sample dispensing, sample delivery and/or for spraying the sample.

In some exemplary embodiments, the container 110 having a cap 116 with an inlet line port and a sheath gas inlet line 112, wherein the sheath gas inlet line 112 can be partially inserted into to the inlet line port.

In some exemplary embodiments, the cap 116 with an outlet line port and a modified desolvation gas outlet line 114, wherein the modified desolvation gas outlet line 114 can be partially inserted into to the outlet line port.

In some exemplary embodiments, the modifier system 106 can be configured to allow a flow of a sheath gas from the sheath gas inlet line 112 through the container 110 into the desolvation gas outlet line 114, for example, the sheath gas being nitrogen.

In some exemplary embodiments, the container can be surrounded by a second container. In some specific exemplary embodiments, the second container can be made from polyethylene. In one aspect, the second container can be capable of providing shatter resistant protection for glass bottles. In another aspect, the second container can have an opening in the top.

In some exemplary embodiments, the container 110 can be made form a borosilicate glass material.

In some exemplary embodiments, a volume of the container 110 can range from about 10 ml to about 5000 ml. In one aspect, a volume of the container 110 can be about 10 ml, about 20 ml, about 30 ml, about 40 ml, about 50 ml, about 60 ml, about 70 ml, about 80 ml, about 90 ml, about 100 ml, about 110 ml, about 120 ml, about 130 ml, about 140 ml, about 150 ml, about 160 ml, about 170 ml, about 180 ml, about 190 ml, about 200 ml, about 210 ml, about 220 ml, about 230 ml, about 240 ml, about 250 ml, about 260 ml, about 270 ml, about 280 ml, about 290 ml, about 300 ml, about 310 ml, about 320 ml, about 330 ml, about 340 ml, about 350 ml, about 360 ml, about 370 ml, about 380 ml, about 390 ml, about 400 ml, about 410 ml, about 420 ml, about 430 ml, about 440 ml, about 450 ml, about 460 ml, about 470 ml, about 480 ml, about 490 ml, about 1000 ml, about 1100 ml, about 1200 ml, about 1300 ml, about 1400 ml, about 1500 ml, about 1600 ml, about 1700 ml, about 1800 ml, about 1900 ml, about 2000 ml, about 2500 ml, about 3000 ml, about 3500 ml, about 4000 ml, about 4500 ml, or about 5000 ml.

In some exemplary embodiments, the container 110 can be a pressure resistant container.

In some exemplary embodiments, the container 110 can have a pressure resistance of at least about 0.5 bar gauge. In one aspect, the container 110 can have a pressure resistance of at least about 0.5 bar gauge, at least about 0.6 bar gauge, at least about 0.7 bar gauge, at least about 0.8 bar gauge, at least about 0.9 bar gauge, at least about 1 bar gauge, at least about 1.1 bar gauge, at least about 1.2 bar gauge, at least about 1.3 bar gauge, at least about 1.4 bar gauge, at least about 1.5 bar gauge, at least about 1.6 bar gauge, at least about 1.7 bar gauge, at least about 1.8 bar gauge, at least about 1.9 bar gauge, or at least about 2.0 bar gauge.

In some exemplary embodiments, the container 110 can be capable of being filled with at least one organic solvent. Non-limiting examples of organic solvents include acetonitrile, propanol, isopropanol, water and methanol.

In some exemplary embodiments, the container 110 can be capable of being filled with at least one acid. Non-limiting examples of acid include acetic acid, propionic acid, and formic acid.

In some exemplary embodiments, the container 110 is capable of being filled with at least one base. Non-limiting examples of base include ammonia, diethylamine, triethylamine, N,N-diisopropylehtylamine (DIPEA), and piperidine. In some exemplary embodiments, the container 110 is capable of being filled with at least one organic solvent and at least one acid.

In some exemplary embodiments, the container 110 is capable of being filled with at least one organic solvent and at least one base.

In some exemplary embodiments, the modifier system can be configured to allow a flow of a sheath gas from the sheath gas inlet line 112 through the container 110 capable of being filled with an organic solvent and an additional chemical component into the desolvation gas outlet line 114.

In some exemplary embodiments, the electrospray ionization source can be capable of providing an electrospray with a solvent flow rate of greater than about 1-5 μL/min. In one aspect, the electrospray ionization source can be capable of providing an electrospray with a solvent flow rate of greater than about 1 μL/min, greater than about 2 μL/min, greater than about 3 μL/min, greater than about 4 μL/min, greater than about 5 μL/min, greater than about 6 μL/min, greater than about 7 μL/min, greater than about 8 μL/min, greater than about 9 μL/min, greater than about 10 μL/min, greater than about 11 μL/min, greater than about 12 μL/min, greater than about 13 μL/min, greater than about 14 μL/min, greater than about 15 μL/min, greater than about 16 μL/min, greater than about 17 μL/min, greater than about 18 μL/min, greater than about 19 μL/min, greater than about 20 μL/min, greater than about 25 μL/min, greater than about 30 μL/min, greater than about 35 μL/min, greater than about 40 μL/min, greater than about 45 μL/min, greater than about 50 μL/min, greater than about 55 μL/min, greater than about 60 μL/min, greater than about 65 μL/min, greater than about 70 μL/min, greater than about 75 μL/min, greater than about 80 μL/min, greater than about 85 μL/min, greater than about 90 μL/min, greater than about 95 μL/min, greater than about 100 μL/min, greater than about 110 μL/min, greater than about 120 μL/min, greater than about 130 μL/min, greater than about 140 μL/min, greater than about 150 μL/min, greater than about 160 μL/min, greater than about 170 μL/min, greater than about 180 μL/min, greater than about 190 μL/min, greater than about 200 μL/min, greater than about 225 μL/min, greater than about 250 μL/min, greater than about 275 μL/min, greater than about 300 μL/min, greater than about 325 μL/min, greater than about 350 μL/min, greater than about 375 μL/min, greater than about 700 μL/min, greater than about 425 μL/min, greater than about 450 μL/min, or greater than about 500 μL/min.

Figure 7:
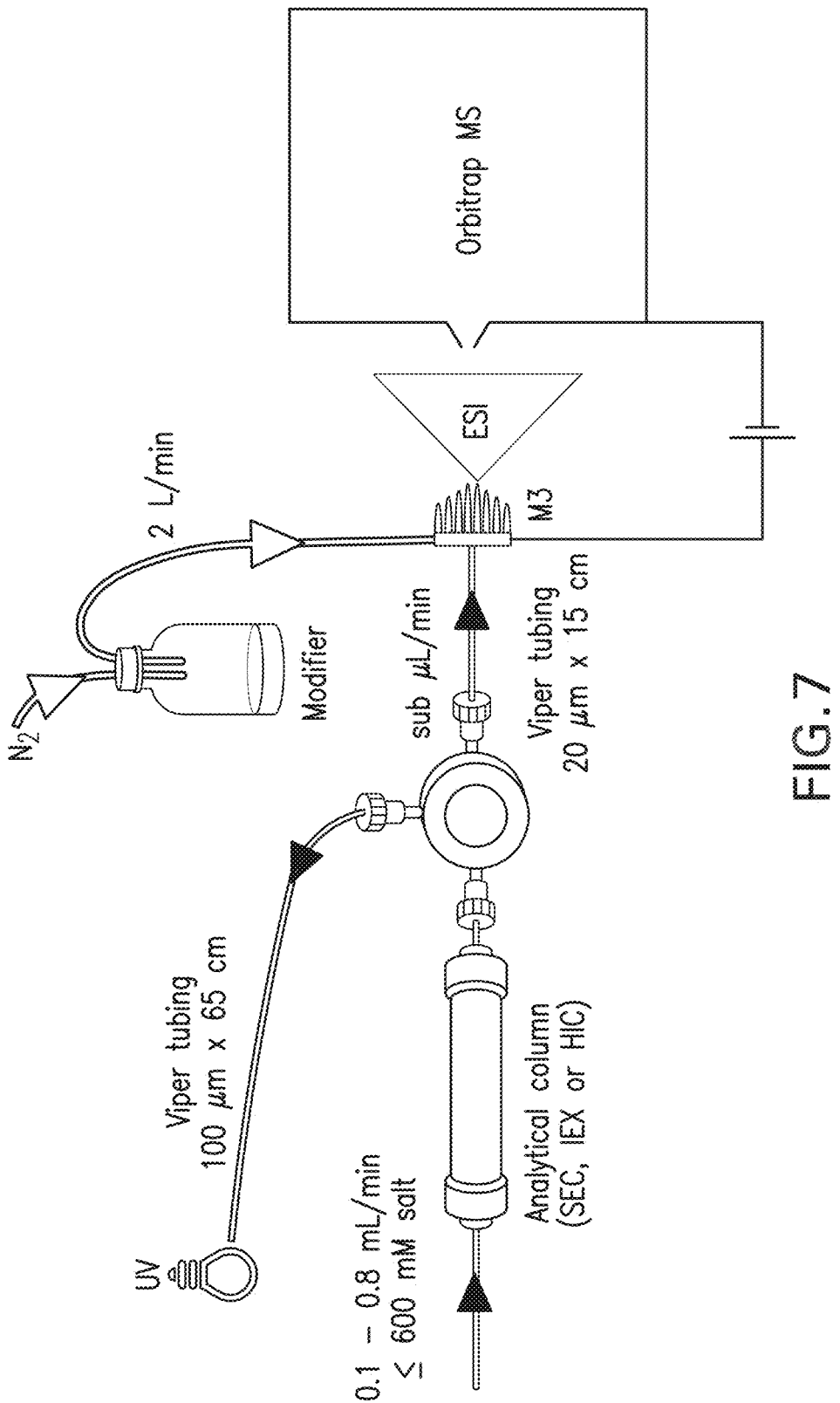
FIG. 7 shows an nLC-MS platform in accordance with embodiments disclosed herein.

In some embodiments, to accommodate a wide range of flow rates (0.1-0.8 mL/min) used in analytical scale separation, a post-column splitting strategy is applied to reduce the flow rates to a range of less than 10 μL/min, such as less than 1 μL/min, less than 0.1 μL/min, or less than 0.01 μL/min that can be readily accommodated by a multi-nozzle emitter, such as an M3 emitter for NSI (see FIG. 7). In some embodiments, the splitting ratio is controlled by two fixed tubings of different dimensions, such as two Viper tubing of different dimensions, connected to a tee, such as a stainless steel tee. In some embodiments, a stainless-steel tee is positioned post-column connecting two Viper tubing with different dimensions (20 μm×15 cm and 100 μm×65 cm to reduce different analytical flows (≤0.8 mL/min) to a micro-flow range (sub μL/min) for native MS detection and divert the remaining high flow for UV detection (such as at 280 nm).

In some exemplary embodiments, the native mass spectrometer 118 can be capable of identifying components of the protein to characterize the protein. The native mass spectrometry system can be a native ESI mass spectrometry system.

In some exemplary embodiments, the mass spectrometer 118 can be a quadrupole-Orbitrap hybrid mass spectrometer. The quadrupole-Orbitrap hybrid mass spectrometer can be Q Exactive™ Focus Hybrid Quadrupole-Orbitrap™ Mass Spectrometer, Q Exactive™ Plus Hybrid Quadrupole-Orbitrap™ Mass Spectrometer, Q Exactive™ BioPharma Platform, Q Exactive™ UHMR Hybrid Quadrupole-Orbitrap™ Mass Spectrometer, Q Exactive™ HF Hybrid Quadrupole-Orbitrap™ Mass Spectrometer, Q Exactive™ HF-X Hybrid Quadrupole-Orbitrap™ Mass Spectrometer, and Q Exactive™ Hybrid Quadrupole-Orbitrap™ Mass Spectrometer.

In some exemplary embodiments, the mass spectrometry system is a Thermo Exactive EMR mass spectrometer. The mass spectrometry system can also contain an ultraviolet light detector.

In some exemplary embodiments, the mass spectrometer 118 can be a QIT-FTICR.

In some exemplary embodiments, the mass spectrometer 118 can be a Qq-FTICR.

In some exemplary embodiments, the mass spectrometer 118 can be a tandem mass spectrometer.

In some exemplary embodiments, the mass spectrometer 118 can be a tandem in time mass spectrometer.

In some exemplary embodiments, the mass spectrometer 118 can be a tandem in space mass spectrometer.

In some exemplary embodiments, the mass spectrometer 118 can be a hybrid wherein tandem-in-time analyzer can be coupled in space or with tandem-in-space analyzer.

In some exemplary embodiments, the method of characterizing a protein in a sample can comprise detecting or quantifying the protein in the sample.

In one exemplary embodiment, the protein can include an antibody, bispecific antibody, antibody fragment or a multispecific antibody.

In some exemplary embodiments, the protein can be a therapeutic antibody.

In some exemplary embodiments, the protein can be an immunoglobulin protein.

In one exemplary embodiment, immunoglobulin protein can be IgG1.

In one exemplary embodiment, immunoglobulin protein can be IgG4.

In some exemplary embodiments, the protein can be a bispecific antibody.

In some exemplary embodiments, the protein can be an antibody fragment formed on digestion of the antibody.

In one exemplary embodiment, the protein can be a protein variant.

In one exemplary embodiment, the protein can be a post-translationally modified protein.

In one exemplary embodiment, the post-translationally modified protein can be a formed by cleavage, N-terminal extensions, protein degradation, acylation of the N-terminus, biotinylation, amidation of the C-terminal, oxidation, glycosylation, iodination, covalent attachment of prosthetic groups, acetylation, alkylation, methylation, adenylation, ADP-ribosylation, covalent cross links within, or between, polypeptide chains, sulfonation, prenylation, Vitamin C dependent modifications, Vitamin K dependent modification, glutamylation, glycylation, glycosylation, deglycosylation, isoprenylation, lipoylation, phosphopantetheinylation, phosphorylation, sulfation, citrullination, deamidation, formation of disulfide bridges, proteolytic cleavage, ISGylation, SUMOylation or ubiquitination (covalent linkage to the protein ubiquitin).

In one exemplary embodiment, the post-translationally modified protein can be formed on oxidation of a protein.

In another exemplary embodiment, the degradation product can include a post-translation modification of a therapeutic protein.

In another exemplary embodiment, the protein can be a degradation product of a protein.

In yet another exemplary embodiment, the protein can be an impurity found in a biopharmaceutical product.

In another exemplary embodiment, the protein can be an impurity found during the manufacture of the biopharmaceutical product.

In some exemplary embodiments, the protein can be a protein with a pI in the range of about 4.5 to about 9.0. In one aspect, the protein can be a protein with a pI of about 4.5, about 5.0, about 5.5, about 5.6, about 5.7, about 5.8, about 5.9, about 6.0, about 6.1 about 6.2, about 6.3, about 6.4, about 6.5, about 6.6, about 6.7, about 6.8, about 6.9, about 7.0, about 7.1 about 7.2, about 7.3, about 7.4, about 7.5, about 7.6, about 7.7, about 7.8, about 7.9, about 8.0, about 8.1 about 8.2, about 8.3, about 8.4, about 8.5, about 8.6, about 8.7, about 8.8, about 8.9, or about 9.0.

In some exemplary embodiments, the protein can be a product-related impurity. The product related impurity can be molecular variants, precursors, degradation products, fragmented protein, digested product, aggregates, post-translational modification form or combinations thereof.

In some specific exemplary embodiments, the protein can be a process-related impurity. The process-related impurity can include impurities derived from the manufacturing process, e.g., nucleic acids and host cell proteins, antibiotics, serum, other media components, enzymes, chemical and biochemical processing reagents, inorganic salts, solvents, carriers, ligands, and other leachables used in the manufacturing process.

In some specific exemplary embodiments, the protein can be an impurity. In one exemplary embodiment, the number of impurities in the sample can be at least two.

The disclosed systems and methods can be used to characterize size variants, charge variants, antibody-antigen binding, PTM characterization, characterization of partially reduced and alkylated mAb, dimer characterization for co-formulated drugs, IgG4 Fab exchange characterization, and highly heterogeneous sample characterization using charge reduction. Exemplary post-translational modifications (PTMs) that can be detected and identified that contribute to acidic variants include but are not limited to glycation, glucuronylation, carboxymethylation, sialylation, non-consensus glycosylation at Fab region. PTMs that can be detected and identified that contribute to basic variants include but are not limited to succinimide formation, N-terminal glutamine (not converted to pyroglutamate), C-terminal Lys and non-/partial-glycosylated species.

1. Size Variants

One embodiment provides a method for characterizing size variants of protein drug product impurities including separating protein components of the protein drug product sample by native SEC chromatography using an aqueous mobile phase, and analyzing the separated protein components by mass spectrometry to characterize high molecular weight species, low molecular weight species, and intermediate high weight species of protein drug product impurities in the protein drug product sample using a disclosed platform. In one embodiment, the mobile phase includes ammonium acetate and ammonium bicarbonate. Using the disclosed platform eliminates the need for deglycosylating a protein drug product sample prior to separation and analysis.

In one embodiment the protein drug product sample is taken from or purified from a fed-batch cell culture, a continuous cell culture or a perfusion cell culture.

Exemplary protein drug products include but are not limited to an antibody, a fusion protein, recombinant protein, or a combination thereof.

Exemplary low molecular weight protein drug product impurities include but are not limited to precursors, degradation products, truncated species, proteolytic fragments including Fab, ligand or receptor fragments or heavy chain fragments, free light chain, half antibody, H2L, H2, HL, HC, or a combination thereof.

Exemplary HMW impurities include but are not limited to mAb trimers and mAb dimers.

Exemplary intermediate HMW include but are not limited to monomer with extra light chains (H2L3 and H2L4 species), monomer plus Fab fragments complexes, Fab2-Fab2, Fc-Fc, and Fab2-Fc.

2. Charge Variant Characterization

One embodiment provides a method for characterizing charge variants of protein drug product impurities including the steps of optionally deglycosylating a protein drug product sample, optionally treating the sample with IdeS from *Streptocoocus pyogenes*, separating protein components of the protein drug product sample by native strong cation exchange chromatography using an aqueous mobile phase, and analyzing the separated protein components by mass spectrometry to characterize charge variant species of protein drug product impurities in the protein drug product sample. In one embodiment, the mobile phase includes ammonium acetate and ammonium bicarbonate. Using the disclosed platform eliminates the need for deglycosylating a protein drug product sample prior to characterization.

In one embodiment the protein drug product sample is taken from or purified from a fed-batch cell culture, a continuous cell culture or a perfusion cell culture.

Exemplary charge variants include but are not limited to glycation, glucuronylation, carboxymethylation, sialylation, non-consensus glycosylation at Fab region. PTMs that can be detected and identified that contribute to basic variants include but are not limited to succinimide formation, N-terminal glutamine (not converted to pyroglutamate), C-terminal Lys and non-/partial-glycosylated species.

Also disclosed are methods of Producing High Purity Protein Drug Products. Some embodiments provide a method of producing an antibody including the steps of culturing cells producing the antibody, for example in a fed-batch culture, obtaining a sample from the cell culture, characterizing and quantifying low molecular weight, high molecular weight, and intermediate molecular weight impurities in the sample using the systems and methods disclosed herein and modifying one or more culture conditions of the cell culture to reduce the amount of characterized low molecular protein drug impurities produced during cell culture of the antibody. Typically, the conditions are changed to have the protein drug impurities in a range of 0.05% and 30.0%, preferably 0.05% to 15%, 0.05% to 10%, 0.05% to 5%, or 0.05% to 2% (w/w).

The one or more conditions of the cell culture that are changed to reduce the amount of low molecular weight protein drug impurities are selected from the group consisting of temperature, pH, cell density, amino acid concentration, osmolality, growth factor concentration, agitation, gas partial pressure, surfactants, or combinations thereof.

In some embodiments, the cells producing the antibody are Chinese hamster ovary cells. In other embodiments, the cells are hybridoma cells.

Another embodiment provides an antibody produced according the methods provided herein have 1 to 5%, 5 to 10%, 10 to 15%, 15 to 20% protein drug impurities.

EXAMPLES

The following examples are put forth so as to provide those of ordinary skill in the art with a complete disclosure and description of how to make and use the methods of the invention, and are not intended to limit the scope of what the inventors regard as their invention. Efforts have been made to ensure accuracy with respect to numbers used (e.g., amounts, temperature, etc.) but some experimental errors and deviations should be accounted for. Unless indicated otherwise, parts are parts by weight, molecular weight is average molecular weight, temperature is in degrees Centigrade, room temperature is about 25° C., and pressure is at or near atmospheric.

Example 1: Materials and Methods

Sample preparation. NISTmAb stock sample was used at a concentration of 10 µg/µL.

Native SEC LC-MS Analysis. For native SEC LC-MS analysis of NISTmAb, 10 µg of NISTmAb were separated using an ACQUITY UPLC Protein BEH C18 Column (200 Å, 1.7 µm, 4.6 mm×300 mm) (Waters, Milford, MA) for online LC-MS analysis on a Q-Exactive UHMR mass spectrometer. For the separation, the mobile phase was 150 mM ammonium acetate in water. Detailed LC gradient and MS parameters are included in Tables 1 and 2, respectively.

TABLE 1

| LC gradient for native SEC LC-MS analysis | | |
|---|---|---|
| Mobile Phase | 150 mM ammonium acetate in water | |
| Column | Waters ACQUITY UPLC Protein BEH 200 Å, 1.7 µm, 4.6 mm × 300 mm column | |
| Column Temperature | 25° C. | |
| Gradient | Time (min) | Flow (mL/min) |
| | 0.0 | 0.200 |
| | 23.0 | 0.200 |

TABLE 2

| MS parameters for native SEC LC-MS analysis | | |
|---|---|---|
| MS parameters | Control Experiment | Desolvation gas modified method |
| Source voltage [kV] | 3.0 | 3.0 |
| Capillary temperature [° C.] | 320 | 320 |
| S-lens RF level | 200 | 200 |
| Sheath gas [L/min] | 2.0 | 2.0 |
| Scan range [m/z] | 2000-15000 | 2000-15000 |

Native SCX LC-MS Analysis. For native SCX LC-MS analysis of NISTmAb, 10 µg of NISTmAb were separated using an YMC BioPro IEX SF 4.6×100 mm (YMC, Japan) for online LC-MS analysis on a Q-Exactive UHMR mass spectrometer. For the separation, the mobile phase A was 20 mM ammonium acetate in water at pH 5.6, mobile phase B was 150 mM ammonium acetate in water. Detailed LC gradient conditions are included in Table 3 and MS parameters are the same as native SEC-MS analysis.

TABLE 3

| LC gradient for native SCX LC-MS analysis | | | |
|---|---|---|---|
| Mobile Phase | A: 20 mM ammonium acetate in water, pH 5.6; B: 150 mM ammonium acetate in water, pH 7.4 | | |
| Column | YMC BioPro IEX SF 4.6 × 100 mm, 5 µm | | |
| Column Temperature | 45° C. | | |
| Gradient | Time (min) | % A | % B |
| | 0 | 100 | 0 |
| | 2 | 100 | 0 |
| | 18 | 0 | 100 |
| | 22 | 0 | 100 |
| | 23 | 100 | 0 |
| | 30 | 100 | 0 |

Modification of the Desolvation Gas. The sheath gas flow was directed to a Duran pressure plus bottle (SCHOTT North America, Inc., Elmsford, NY) through a Canary-Safe Cap (Analytical Sales and Services, Inc., Flander, NJ) using ⅛" TEFLON tubing (See FIG. 1). The outgoing tubing from the bottle was then directly connected to a Newomics M3 Emitter in a Thermo Scientific Ion Max ion source. For native intact MS analysis, 200 mL of isopropanol (IPA) were transferred into the bottle.

Example 2: Native SEC-MS Platform Sensitivity and Robustness

Figure 3:
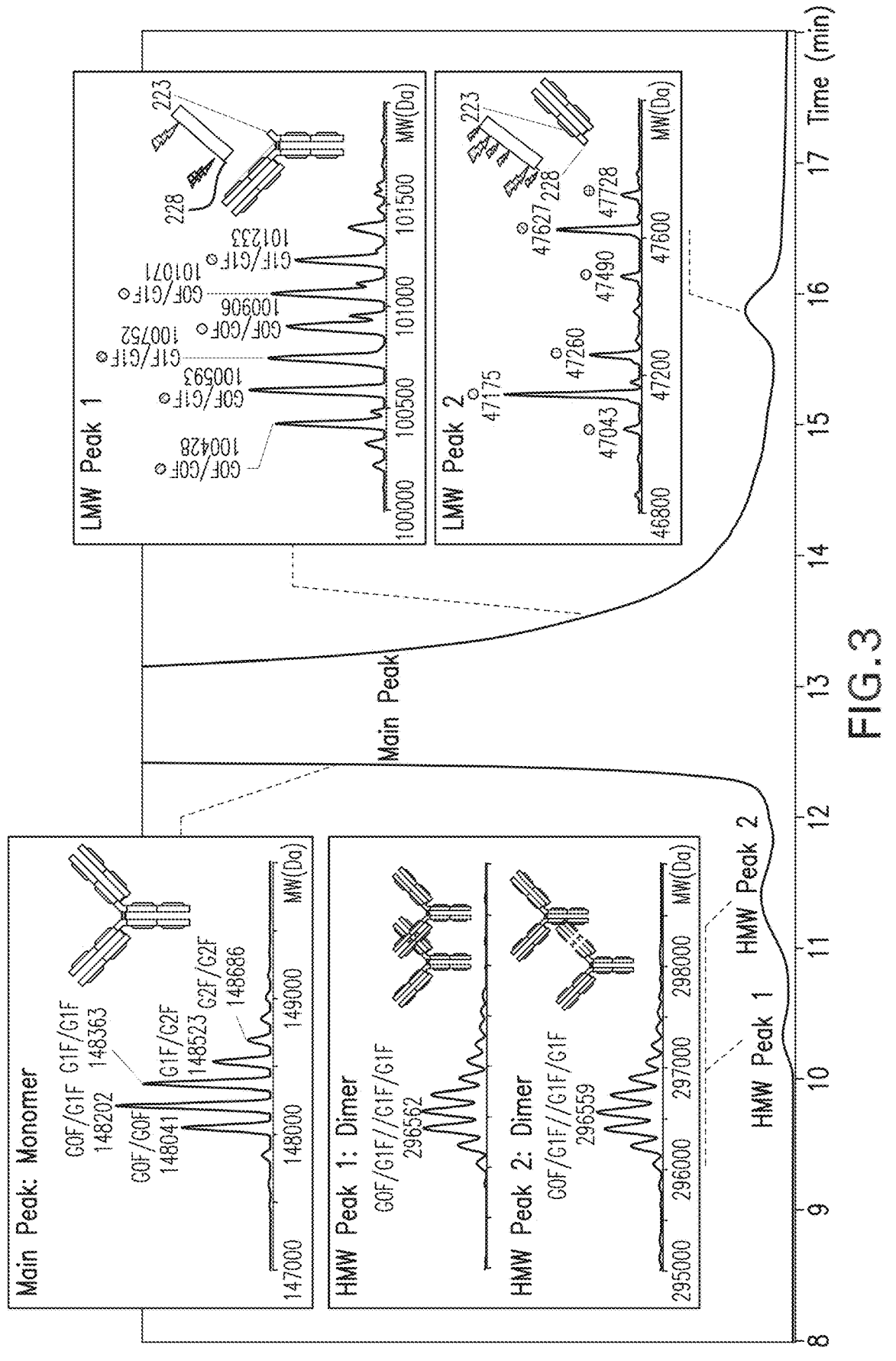
FIG. 3 shows platform sensitivity by SEC-MS analysis of NISTmAb (10 µg). Low consumption of sample amount, injection of 10 µg of NISTmAb sample leads to ~E9 TIC intensity. Excellent data quality due to efficient desolvation assisted by IPA-modified desolvation gas. Sensitive detection of low abundance species (e.g., HMW and LMW species) without the need for deglycosylation. Accurate mass measurements enable unambiguous identification of these species.
Figure 4A:
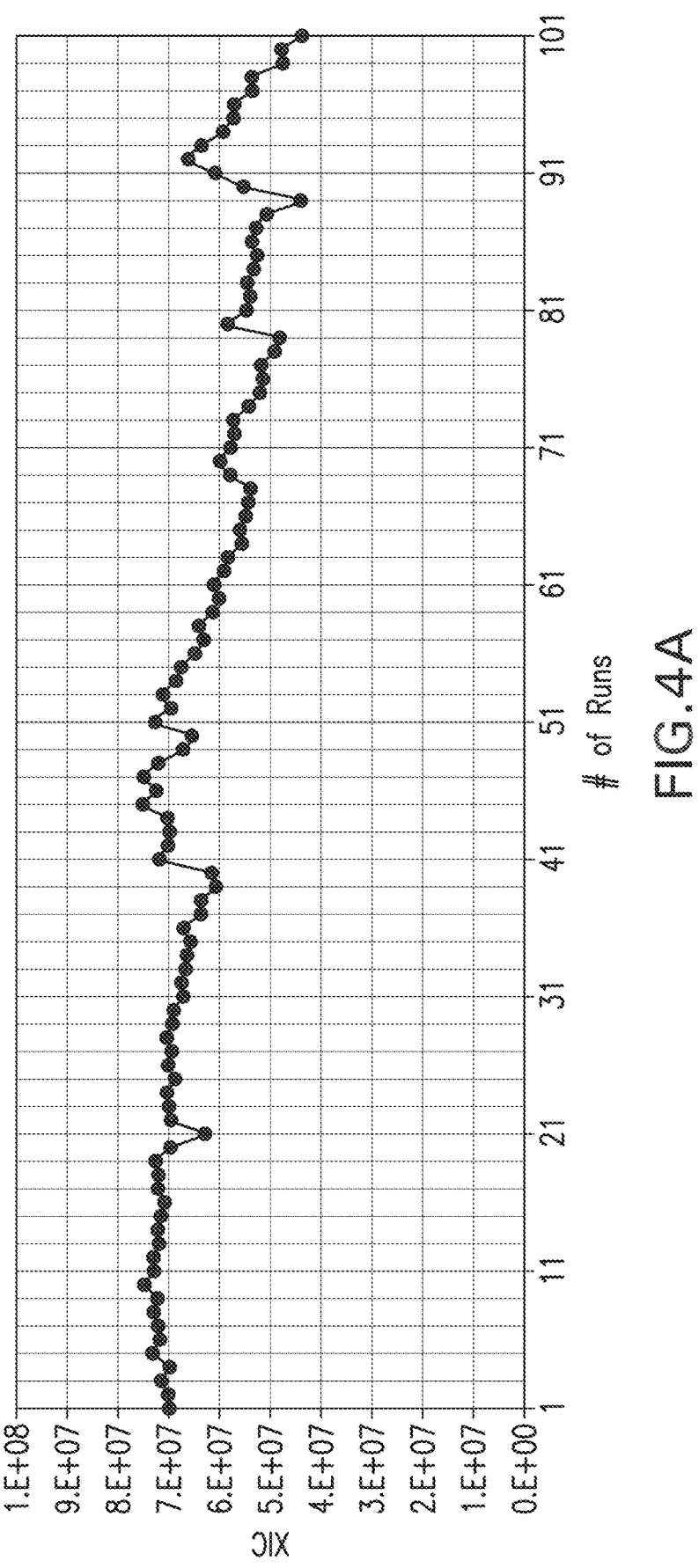
FIGS. 4A and 4B show platform robustness as demonstrated by 101 consecutive native SEC-MS runs of NISTmAb.
Figure 4B:
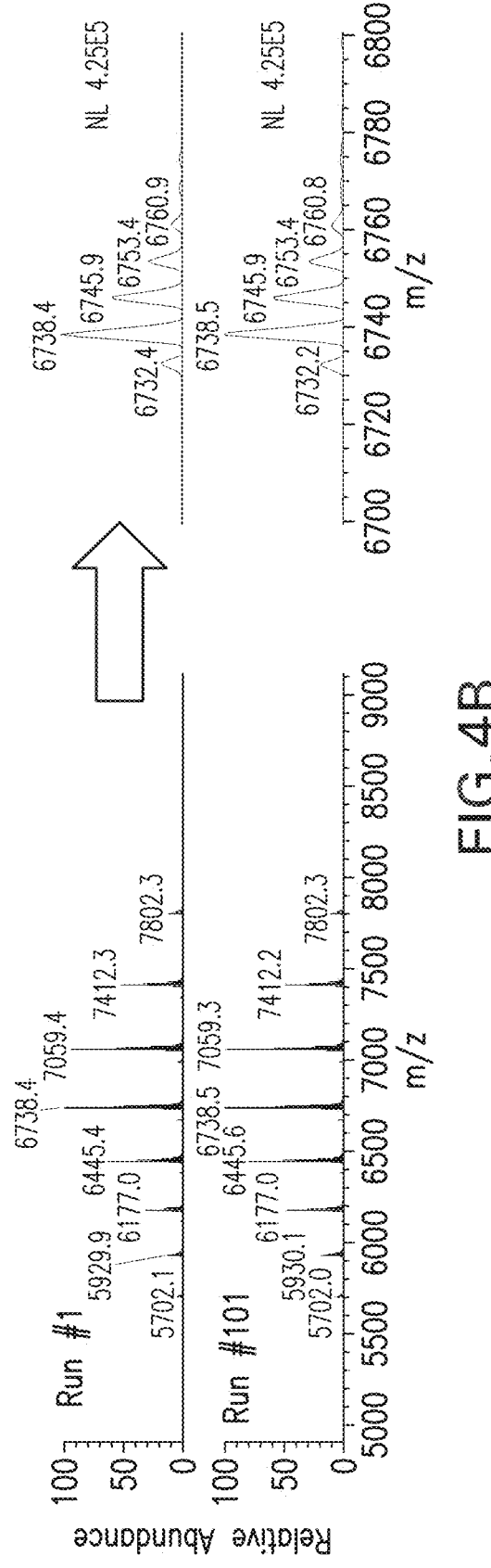

Using the Methods and Materials described in Example 1, the sensitivity of the disclosed platform was demonstrated by performing native SEC-MS analysis of NISTmAb. Native SEC-MS analysis was performed on a 10 µg of NISTmAb. As illustrated in FIG. 3, injection of 10 µg of NISTmAb sample led to ~E9 TIC intensity which demonstrates low consumption of sample amount with the disclosed platform. Superior data quality due to efficient desolvation assisted by IPA-modified desolvation gas was also observed with the disclosed platform. Sensitive detection of low abundance species (e.g., HMW and LMW species) was demonstrated without the need for deglycosylation. Accurate mass measurements enabled unambiguous identification of these species. Further, FIGS. 4A and 4B illustrate platform robustness as demonstrated by 101 consecutive native SEC-MS runs of NISTmAb and the relative abundance was almost identical between the first and 101th runs.

Example 3: Effective Desolvation Gas Modification for Charge Reduction

Figure 5A:
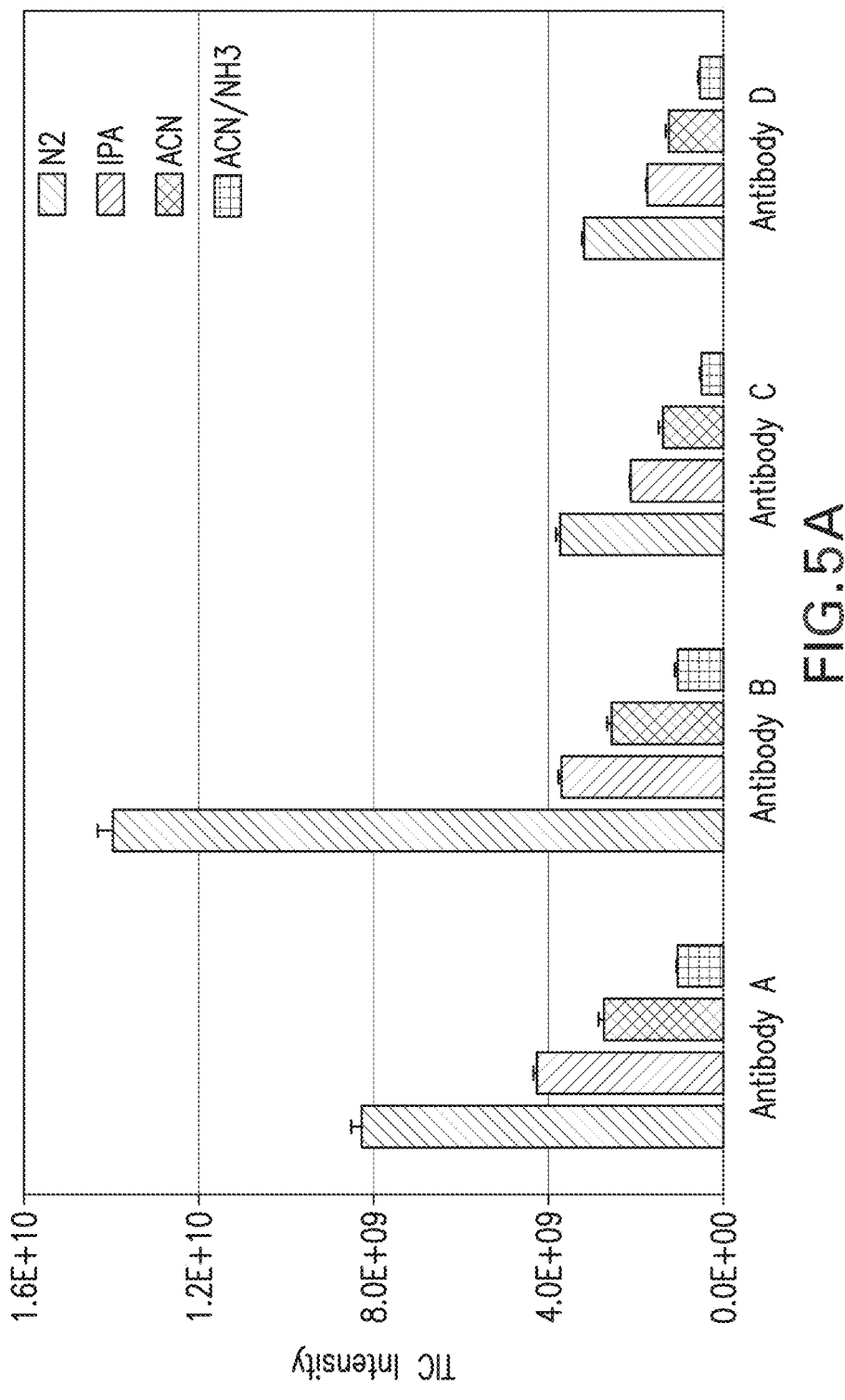
FIGS. 5A and 5B show charge reduction effect enabled by modifying the desolvation gas during native SCX-MS analysis.
Figure 5B:
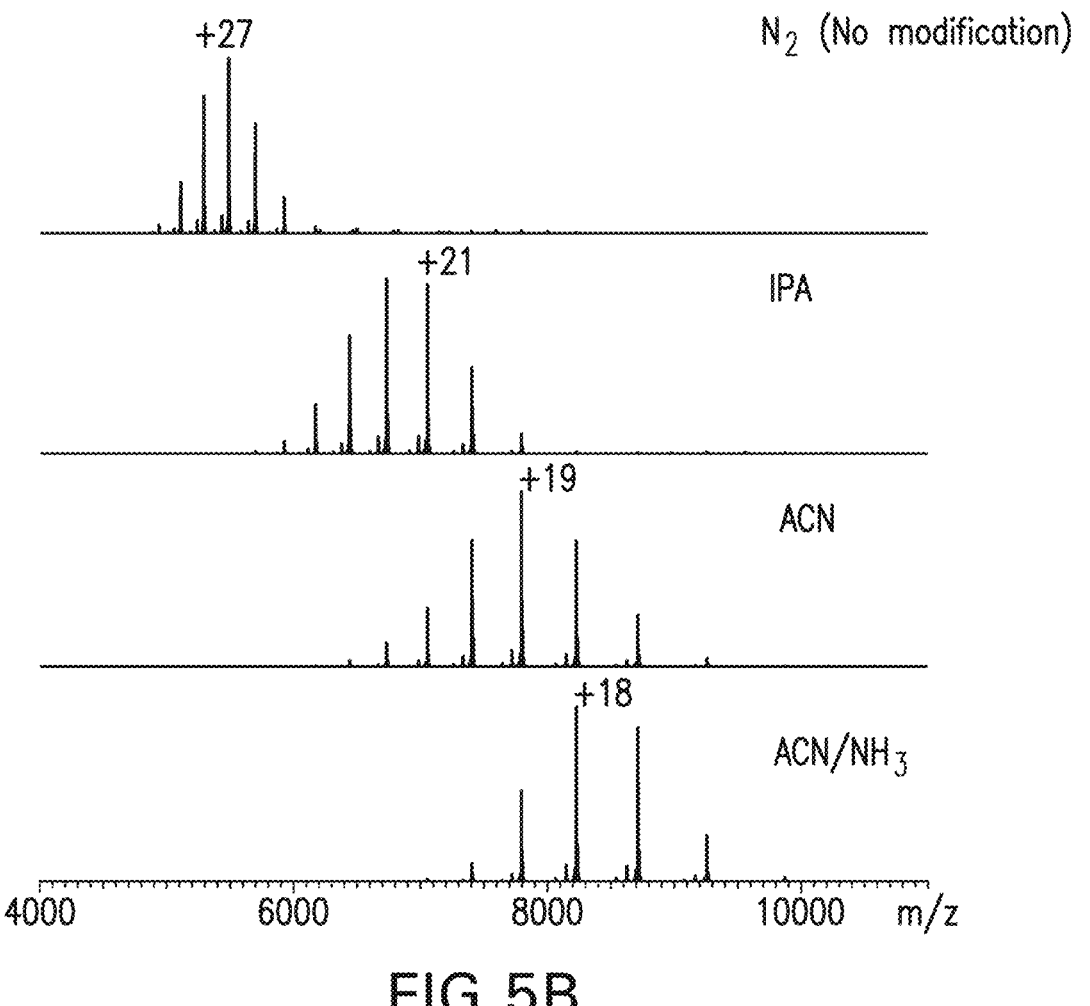
Figure 6:
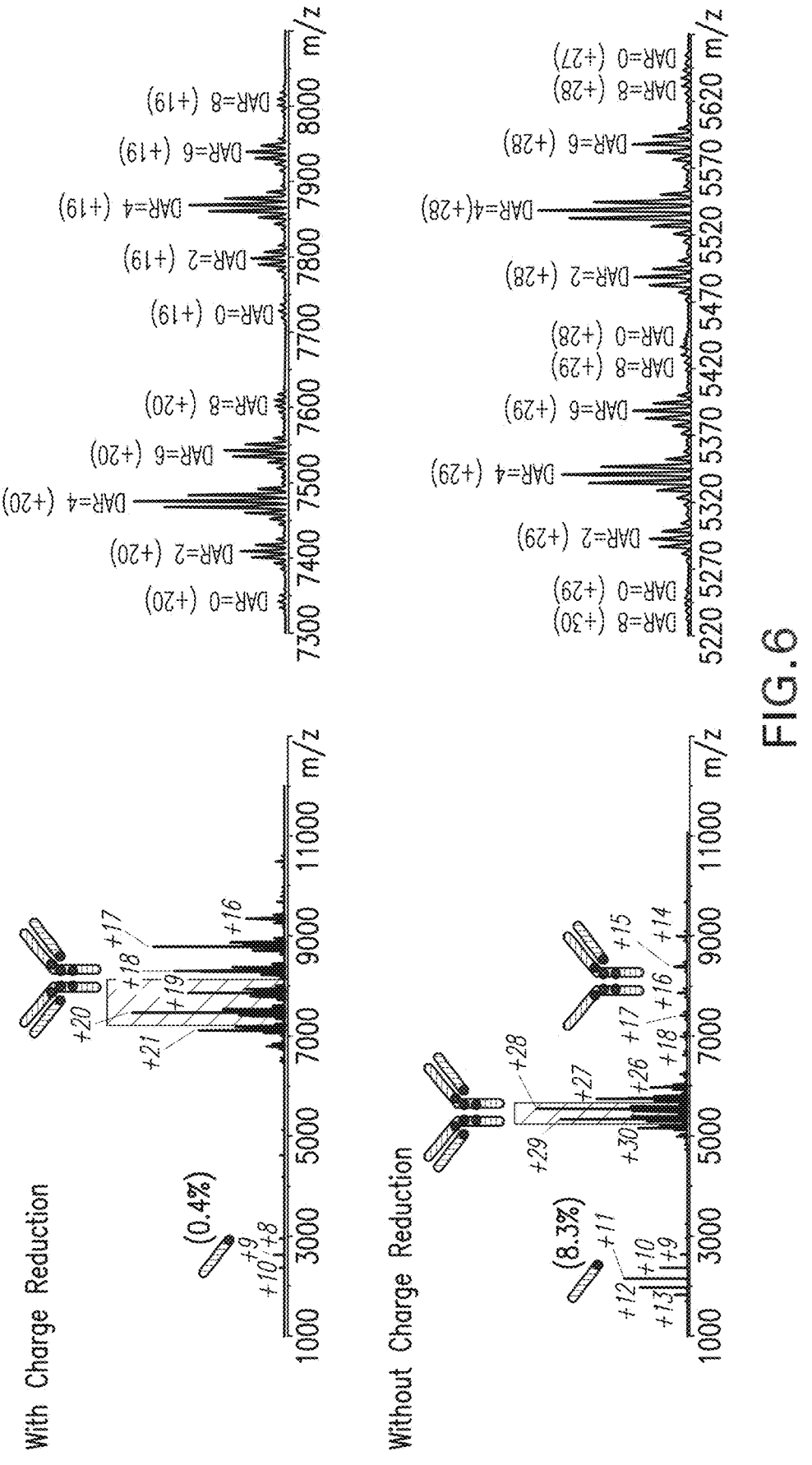
FIG. 6 shows charge reduction assisted analysis of heterogeneous and/or labile biomolecules. The top panel provides the results of native SEC-MS analysis of cysteine ADC mimic with charge reduction and the bottom panel without charge reduction. As illustrated, charge reduction prevented the charge states from overlapping due to improved spatial resolution, enabling analysis of sample with high mass heterogeneity. Further, charge reduction assisted with preserving the labile biomolecules (non-covalently linked) during ionization process and minimized undesired dissociation events.

Studies were performed to determine the effect of modifying the desolvation gas during native SCX-MS analysis. As illustrated in FIGS. 5A and 5B, a slight TIC intensity drop was associated with charge reduction when the desolvation gas was modified with IPA, ACN or ACN/NH3. As shown in FIG. 6, charge reduction assisted analysis of heterogeneous and/or labile biomolecules. The top panel of FIG. 6 shows native SEC-MS analysis of cysteine ADC mimic with charge reduction whereas the bottom panel is without reduction. Charge reduction prevents the charge states overlapping due to improved spatial resolution, enabling analysis of sample with high mass heterogeneity. Charge reduction prevents the charge states overlapping due to improved spatial resolution, enabling analysis of sample with high mass heterogeneity. Moreover, charge reduction helped preserve the labile biomolecules (non-covalently linked) during ionization process and minimized undesired dissociation events.

Example 4: Versatile, Sensitive, and Robust Native LC-MS Platform for Intact Protein Mass Analysis Additional examples of a versatile, sensitive and robust native LC-MS platform in accordance with embodiments disclosed herein are provided below.

In the past several years, hyphenation of native (non-denaturing) liquid chromatography (nLC) methods, such as size exclusion chromatography (SEC), ion exchange chromatography (IEX), and hydrophobic interaction chromatography (HIC), with mass spectrometry (MS) has gained a lot of interest in studying the size, charge, and structural heterogeneity of protein drug products. Despite the availability of a wide variety of nLC-MS methods, an integrated platform that can accommodate different applications is still lacking. In this Example, described is the development of a novel nLC-MS platform that can readily enable different nLC-MS applications and features great versatility, sensitivity, and robustness. In particular, the developed platform can tolerate a wide range of LC flow rates and high salt concentrations, which are key to the achieved versatility in accommodating different nLC methods. In addition, a dopant-modified desolvation gas could be easily applied using this platform to achieve charge-reduction native MS in order to improve the characterization of both heterogeneous and labile biomolecules. Finally, it is demonstrated that this nLC-MS platform is highly sensitive and robust that can be routinely applied in protein drug characterization.

Materials. Deionized water was provided by a MilliQ integral water purification system installed with a MilliPak Express 20 filter (Millipore Sigma, Burlington, MA). NIST Monoclonal Antibody Reference Material 8671 (NIST-mAb, humanized IgG1K monoclonal antibody) was purchased from National Institute of Standards and Technology (Gaithersburg, MD). Ammonium acetate (LC/MS grade) and SigmaMAb Antibody Drug Conjugate (ADC) Mimic were purchased from Sigma-Aldrich (St. Louis, MO). Peptide N-glycosidase F (PNGase F) was purchased from New England Biolabs Inc (Ipswich, MA). Invitrogen UltraPure 1 M Tris-HCl buffer, pH 7.5 was obtained from Thermo Fisher Scientific (Waltham, MA). Acetonitrile (ACN) (Optima LC/MS grade) were purchased from Thermo Fisher Scientific (Waltham, MA), ammonium hydroxide (NH3) (30%) was purchased from J.T. Baker (Center Valley, PA). 2-propanol (IPA) (HPLC grade) was purchased from Honeywell (Muskegon, MI). All other monoclonal antibodies including both IgG1 and IgG4 subclasses were produced at Regeneron (Tarrytown, NY).

Sample Preparation. The mAb mixture sample was prepared by mixing four in-house mAbs at final concentrations of 5 mg/mL for each mAb. One aliquot of the mixture was treated with PNGase F (1 IUB milliunit per 10 μg of protein) in 100 mM Tris-HCl (pH 7.5) at 45° C. for 1 hour prior to nSEC-MS analysis. Another aliquot was directly subjected to nIEX-MS analysis without sample treatment. All other mAb samples, including the SigmaMAb ADC mimic, were diluted to 2-5 mg/mL with water before injected to nLC-MS analysis.

nLC-MS Method. All LC separations were performed on an UltiMate 3000 UHPLC System (Thermo Fisher Scientific, Bremen, Germany). For nSEC-MS analysis, an Acquity BEH200 SEC column (4.6×300 mm, 1.7 μm, 200 Å) (Waters, Milford, MA) was used at room temperature with an isocratic elution of 150 mM of ammonium acetate at 0.2 mL/min. For nIEX-MS analysis, a BioPro IEX SF column (4.6 mm×100 mm, 5 μm) (YMC Co., LTD., Kyoto, Japan) was used at 45° C. with a linear gradient from 20 mM of ammonium acetate (pH 5.6, adjusted with acetic acid) to 150 mM of ammonium acetate (pH 6.8) in 16 minutes at 0.4 mL/min. For desalting SEC-MS analysis, an Acquity BEH200 SEC guard column (4.6×30 mm, 1.7 μm, 200 Å) (Waters, Milford, MA) was used at room temperature with isocratic elution of 150 mM of ammonium acetate with the following flow rates: 0.1 mL/min, 0.2 mL/min, 0.4 mL/min, 0.6 mL/min or 0.8 mL/min. To enable online native MS detection, a stainless-steel tee was applied post-column connecting two Viper tubing with different dimensions (20 μm×15 cm and 100 μm×65 cm (Thermo Fisher Scientific, Waltham, MA) to reduce different analytical flows 0.8 mL/min) to a microflow range (sub μL/min) for native MS detection and divert the remaining high flow for UV detection (280 nm). A Thermo Q Exactive UHMR or Exactive Plus EMR mass spectrometer equipped with a Nanospray Flex™ Ion Source (Thermo Fisher Scientific, Bremen, Germany) was used for native MS analysis. To achieve nano-electrospray (NSI) with microflow, a Newomics Microfabricated Monolithic Multi-nozzle (M3) emitter (Berkley, CA) was applied. To achieve charge reduction native MS, a dopant-modified desolvation gas (2 L/min, nitrogen), as achieved by passing the gas flow through the headspace of a DURAN pressure plus bottle (1 L) (SCHOTT North America, Inc., Elmsford, NY) containing 200 mL of various modifiers (e.g., IPA, ACN or 5% ammonia in ACN), was applied to assist the NSI (FIG. 7). All experiments in this Example were performed with IPA-assisted native MS analysis unless specified otherwise. The MS resolution was set at 12,500 (UHMR) or 17,500 (EMR), the capillary spray voltage was set at 3.0 kV, the capillary temperature was set at 350° C., the S-lens RF level was set at 200, the in-source fragmentation energy was set at 100 (or 50 for ADC mimic analysis), the HCD trapping gas pressure was set at 3. Mass spectra were acquired with an m/z range window between 2000 and 15000.

An Integrated nLC-MS Platform. For the characterization of protein drugs by nLC-MS, analytical scale columns (I.D. of 2.1 mm or 4.6 mm) were used as they have many advantages. First, compared to the capillary column format, a much broader selection of analytical scale columns is readily available, and therefore facilitating method development, particularly for those challenging molecules. Moreover, analytical scale columns prevail in robustness and throughput, and are widely used with optical detection in quality control (QC) assays. By performing nLC-MS analysis on an identical analytical column, although with different mobile phase conditions, it is still more likely to generate comparable results to QC assays, as compared to using a capillary column. To cope with a wide range of flow rates (0.1-0.8 mL/min) used in analytical scale separation, a post-column splitting strategy was applied to reduce the flow rates to a range (<10 µL/min) that can be readily accommodated by a multi-nozzle emitter (M3) for NSI (FIG. 7). The splitting ratio was mainly controlled by the two fixed Viper tubing of different dimensions connected to a stainless-steel tee (FIG. 7) and remained un-changed for all tested nLC methods in this study. Noteworthy is that the multi-nozzle design of M3 emitter is relevant to the success of performing NSI at sub-micro flow rates, as it further reduces the flow rates by splitting the sub-microflow into its eight nozzles before NSI. In the meantime, application of NSI not only reduces the harshness of the source conditions for soft ionization, but also significantly increases the MS sensitivity, as well as the tolerance towards high salt concentrations, a feature that is key to accommodate a wide variety of nLC methods (e.g., SEC, IEX and HIC). Moreover, unlike a majority of other NSI setups, this M3 emitter-based approach allows desolvation gas to be applied to the spray emitter via a built-in desolvation gas line (FIG. 7), which is useful to achieve improved spray stability and desolvation efficiency. In addition, this also provided an opportunity to further expand the versatility of the platform through desolvation gas modification. For example, by simply doping the desolvation gas with volatile organic modifiers with charge reducing capability (FIG. 7), online charge reduction can be readily achieved for native MS analysis. As this platform was built with all readily accessible parts without any customization, it can be easily maintained for consistent performance. In the following paragraphs, extensive evaluations were performed to demonstrate the versatility, sensitivity, and robustness of this nLC-MS platform.

Figure 8A:
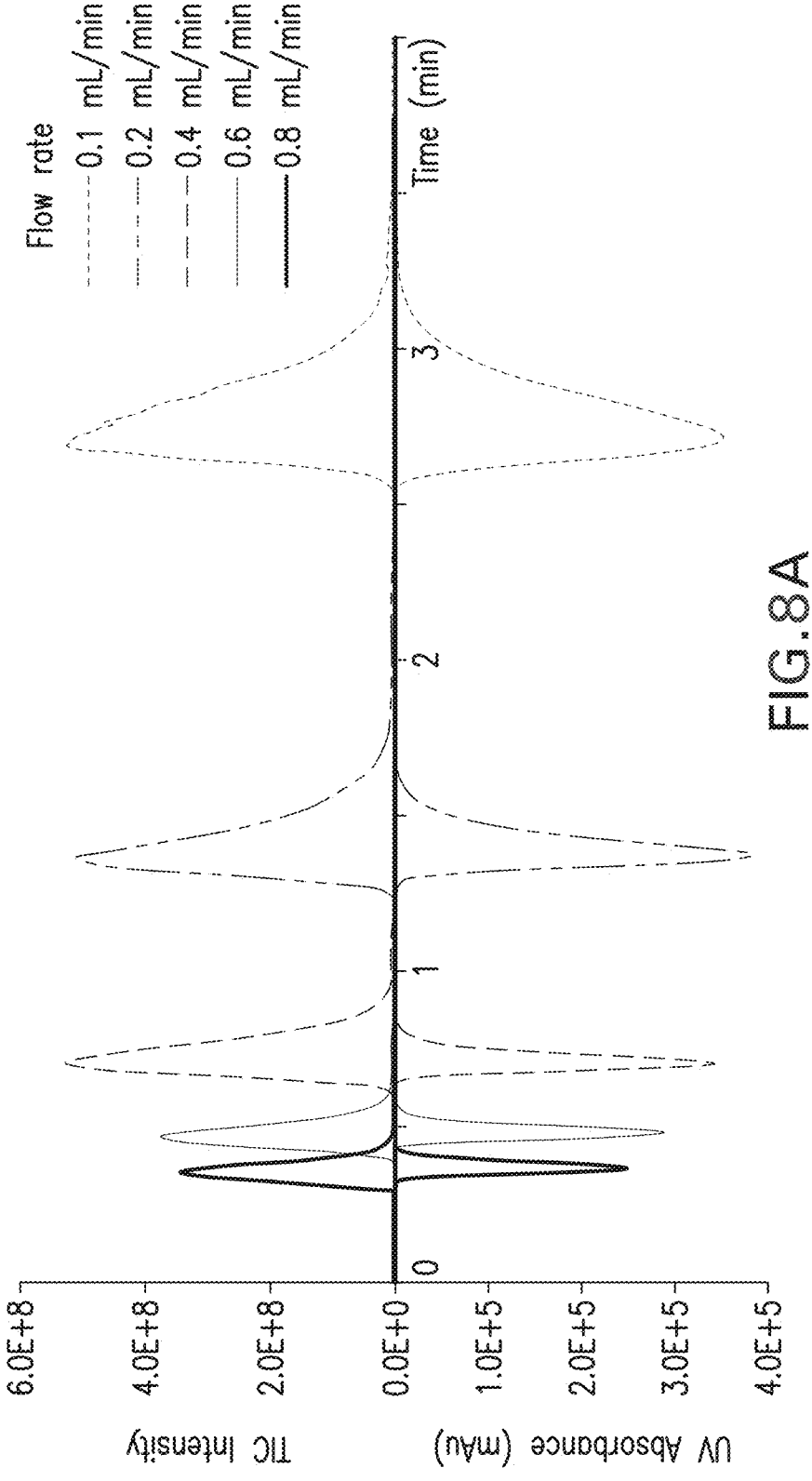
FIG. 8A shows UV and TIC traces generated from desalting SEC-MS analysis of mAb1 under different flow rates.
Figure 12A:
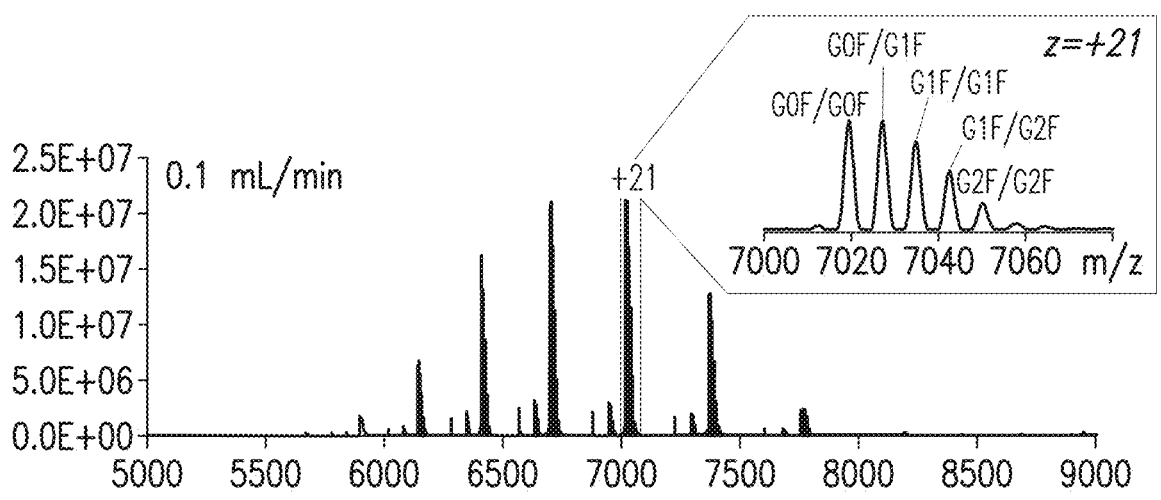
FIGS. 12A and 12B show a native mass spectra from desalting SEC-MS analysis of mAb1 using mobile phase flow rate of 0.1, 0.2, 0.4, 0.6, and 0.8 mL/min.
Figure 12A:
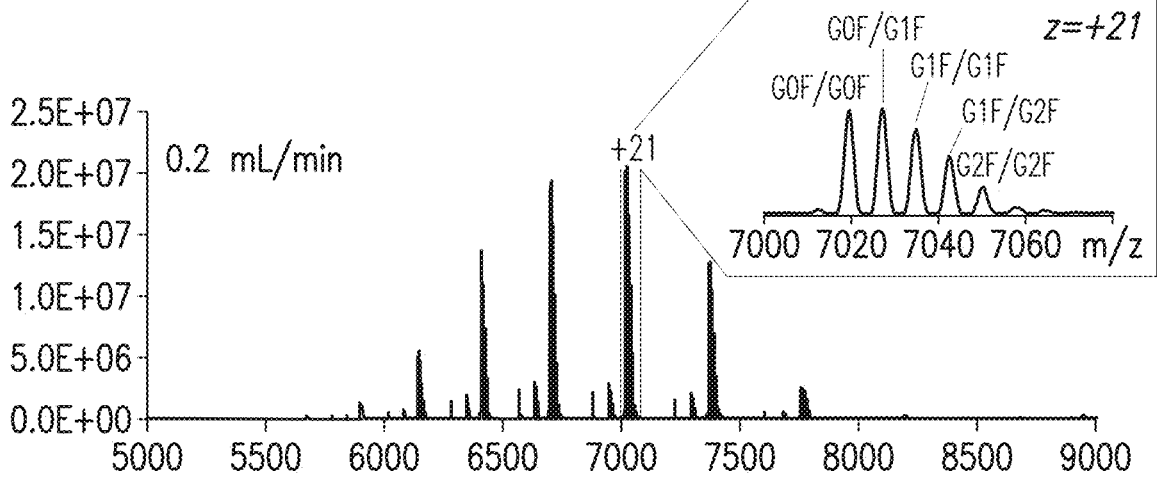
Figure 12A:
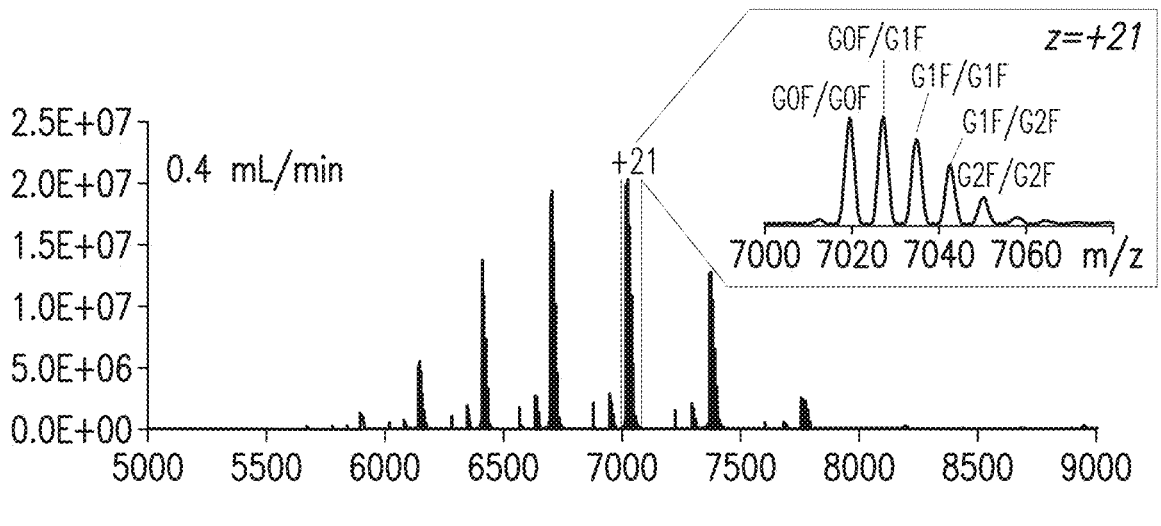
Figure 12B:
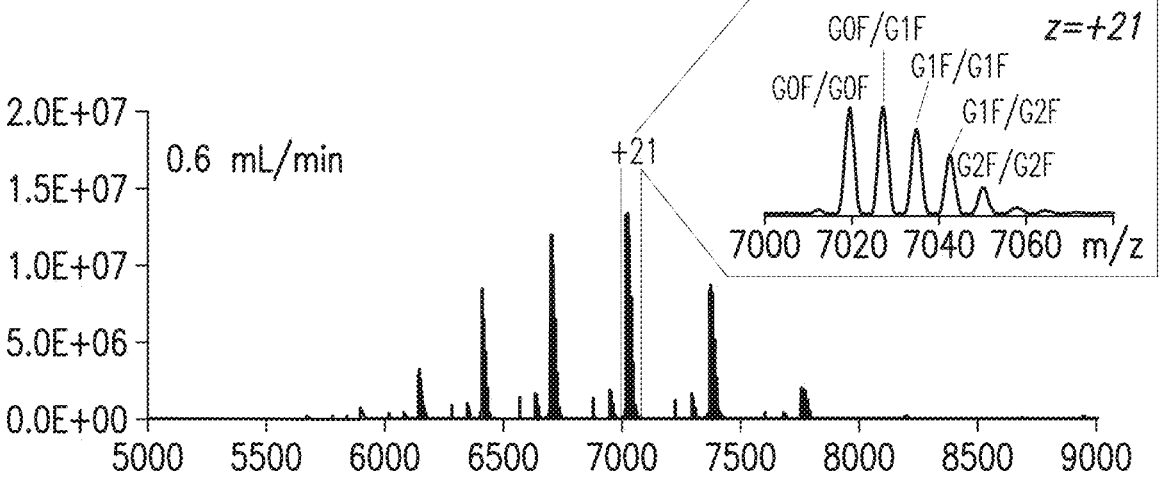
Figure 12B:
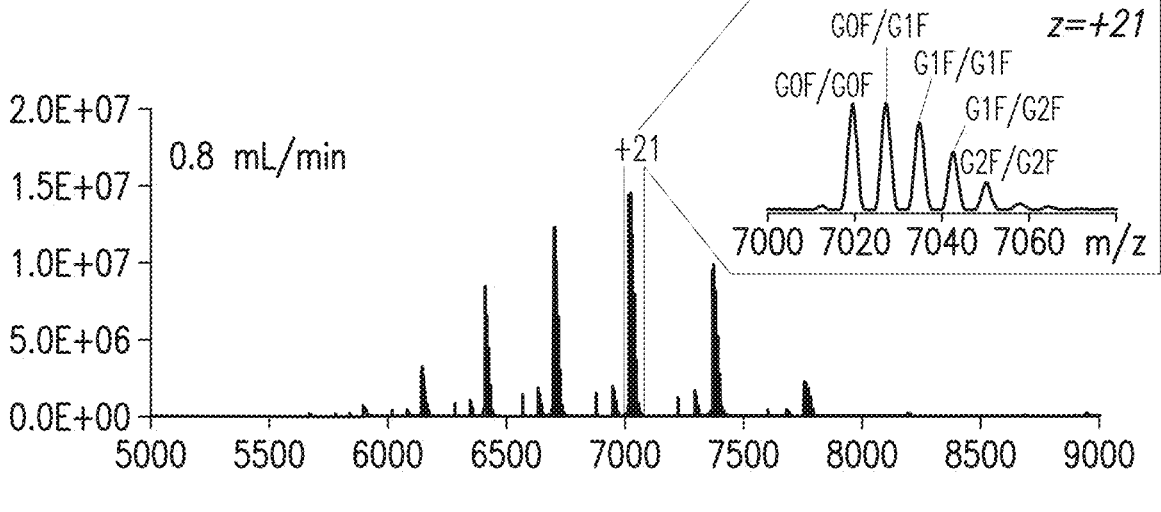

Platform Versatility for nLC Integration. When different nLC methods (e.g., SEC, IEX and HIC) are adopted for nLC-MS analysis, the volatile salt concentrations used in mobile phases and/or LC flow rates often need to be optimized to achieve the best chromatographic performance. Hence, it is desirable that the developed nLC-MS platform can handle a wide range of LC flow rates and salt concentrations to accommodate different nLC-MS applications. To evaluate the tolerance of this nLC-MS platform towards different flow rates and salt concentrations, two tests were conducted by performing native MS analysis of a mAb1 sample after a rapid online desalting step using a Waters BEH200 SEC guard column (4.6 mm×30 mm). First, using 150 mM ammonium acetate as mobile phase and an injection amount of 10 µg, five different flow rates ranging from 0.1 to 0.8 mL/min were tested. Without changing the splitting settings or the MS source parameters, the total ion chromatograms (TICs) generated from the five flow rates all exhibited good signal intensity, spray stability, as well as high resemblance to their corresponding UV profiles (FIG. 8A). In particular, the relative intensities of the UV and TIC peaks generally correlated with each other at different flow rates, indicating that the NSI-MS sensitivity at higher flow rates was not compromised due to less sufficient desolvation. In addition, the averaged raw MS spectra obtained under these five conditions all exhibited highly symmetric m/z peaks and excellent signal to noise ratio (FIGS. 12A and

Figure 8B:
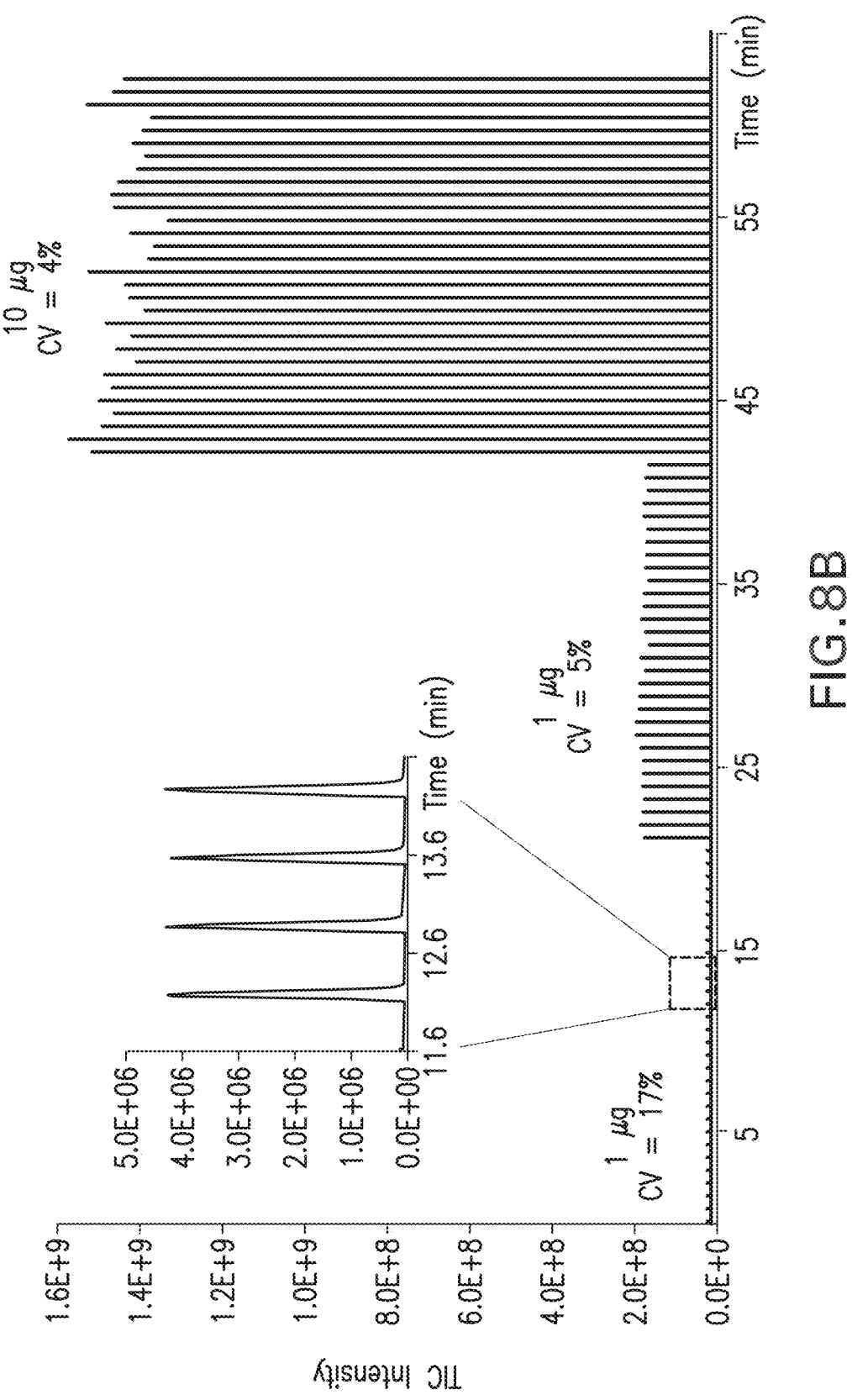
FIG. 8B shows a TIC trace from 90 desalting SEC-MS runs of mAb2 at 0.8 mL/min. Each injection amount (0.1, 1 and 10 µg) was repeatedly analyzed for 30 times. The inset displays a zoomed-in region containing 4 desalting SEC-MS runs.

12B), indicating sufficient desolvation even under the fastest flow rate tested (0.8 mL/min). These observations indicate this developed nLC-MS platform can well tolerate an LC flow rate between 0.1 to 0.8 mL/min, which should suffice a majority of nLC-MS applications. Moreover, it is worth noting that the success of operating high flow rates on a short SEC column for fast and efficient desalting on this platform presented great promises in native MS-based high-throughput screening applications. As a proof-of-concept, 2 µL of mAb2 samples at three different concentrations (0.05, 0.5 and 5 µg/µL) were repeatedly injected for 30 times each and analyzed at 0.8 mL/min, and the resulting TIC was presented in FIG. 8B. Because of the high flow rate applied, the duty cycle between injections was as short as 42 seconds, which corresponds to a throughput of ~2,050 samples per day. Although the achieved throughput is not as high when compared to some direct infusion-based MS platforms, this SEC-MS based approach prevails in minimal sample treatment, which not only saves benchwork time but also reduces risks of introducing sample-preparation induced artifacts. In addition, analysis of 30 replicates demonstrated both excellent MS sensitivity and repeatability, as evidenced by the low coefficient of variation values (CVs of 17%, 5%, and 4% for 0.1, 1, and 10 µg injection amount, respectively). The higher CV for analyses of 0.1 µg injections was likely attributed to the gradual decrease in stock protein concentration (0.05 µg/µL), as a result of needle adsorption-induced sample loss from repeated injections.

Figure 9A:
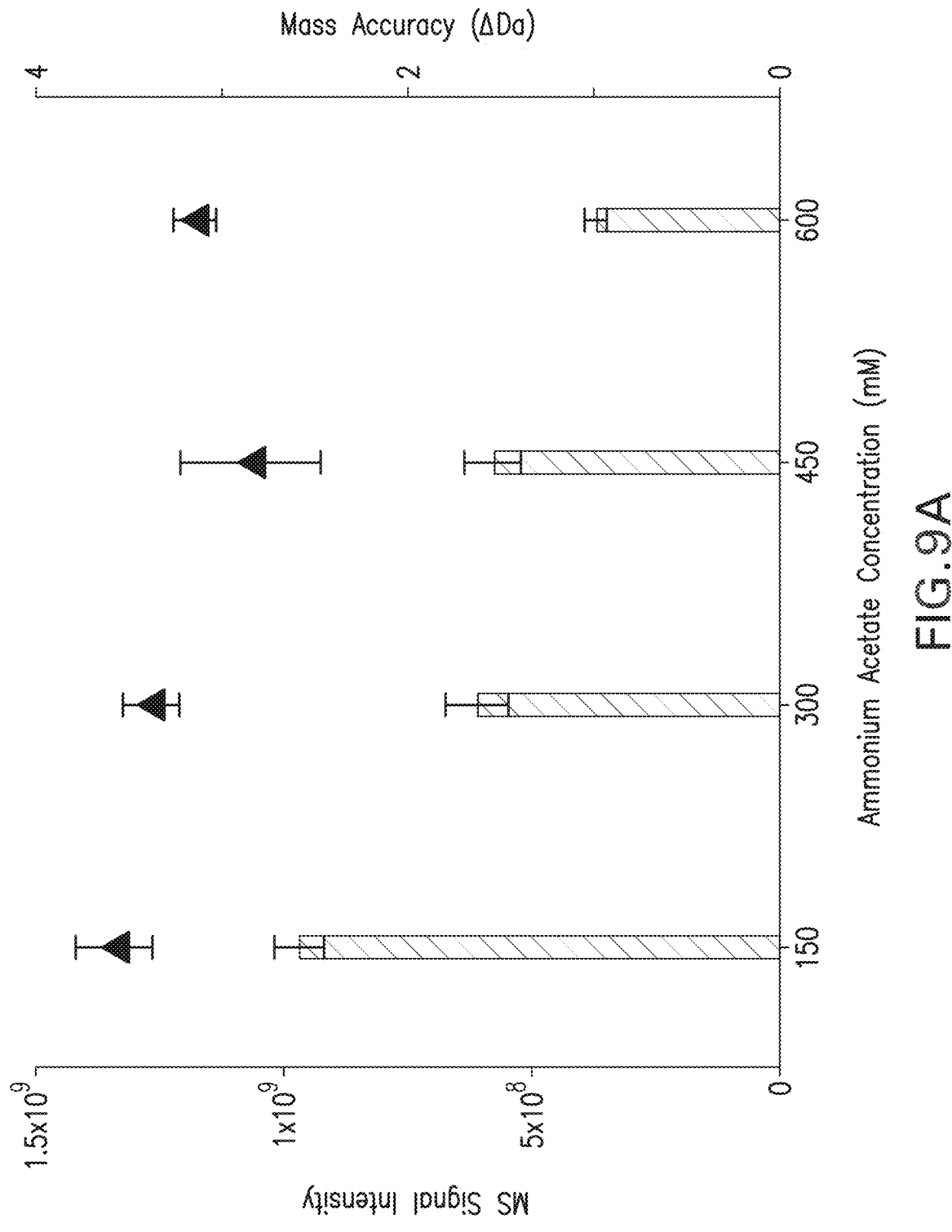
FIGS. 9A and 9B show desalting SEC-MS analysis of mAb1.
Figure 9B:
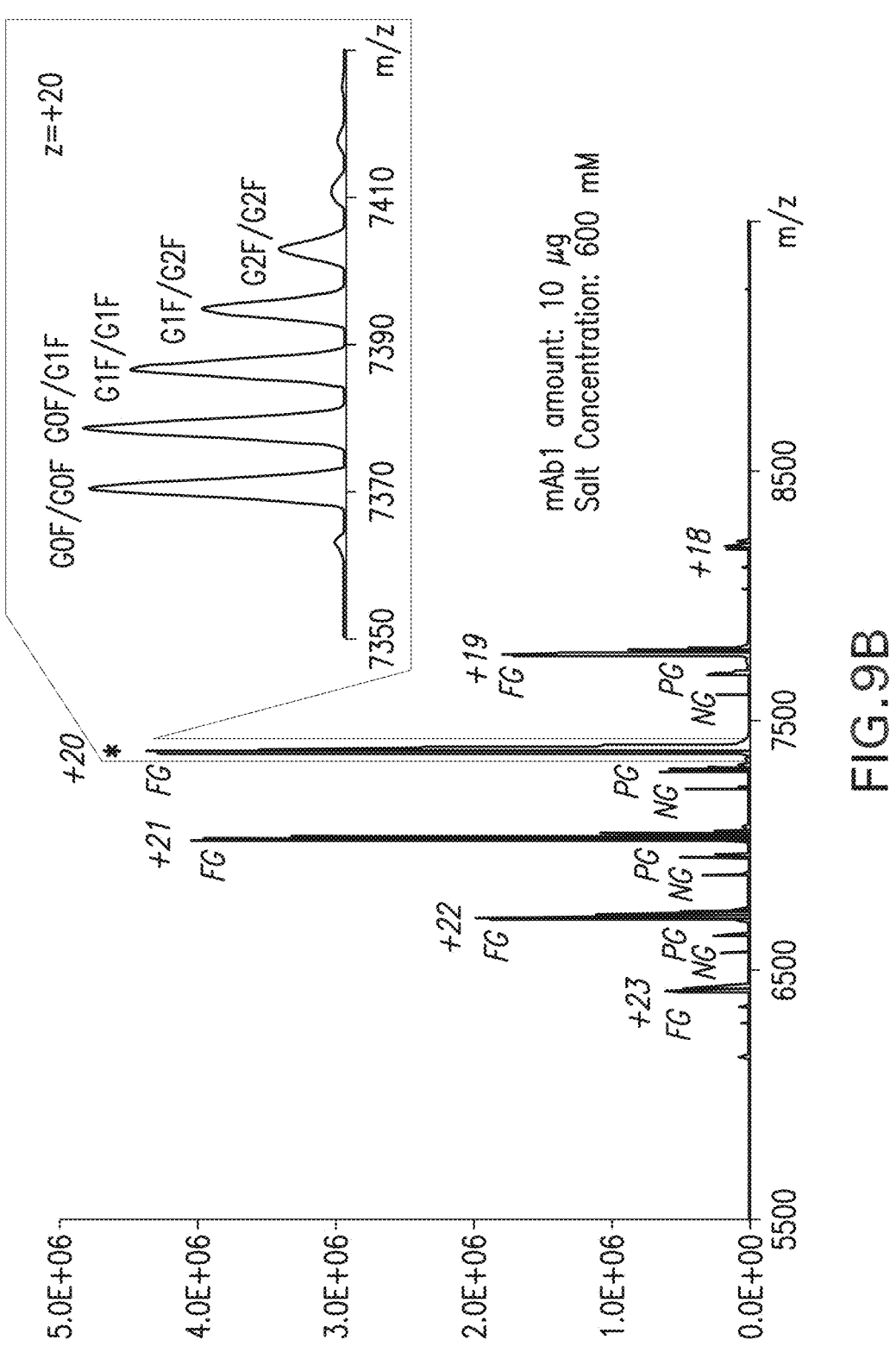
Figure 13A:
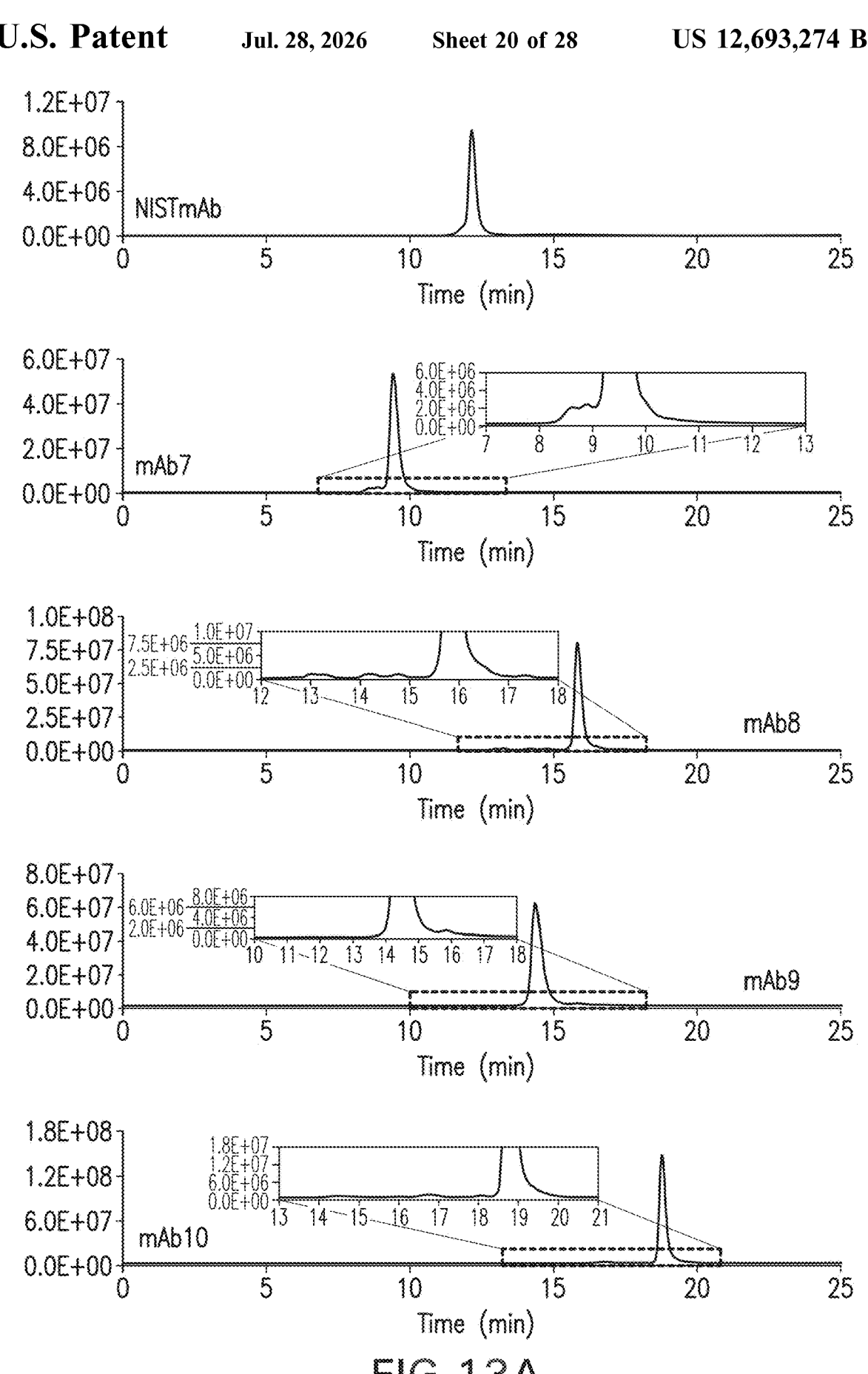
FIGS. 13A and 13B show TIC of nine continuous native HIC-MS analysis of different mAbs using make-up splitting flow strategy on the native LC-MS platform.
Figure 13B:
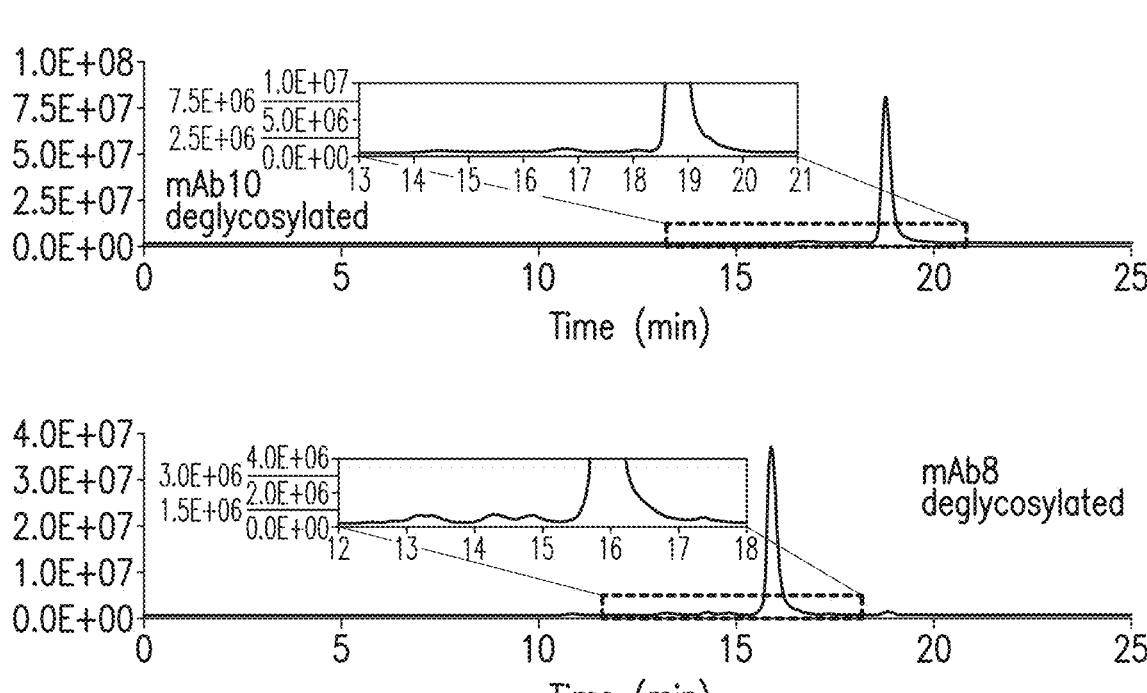
Figure 13B:
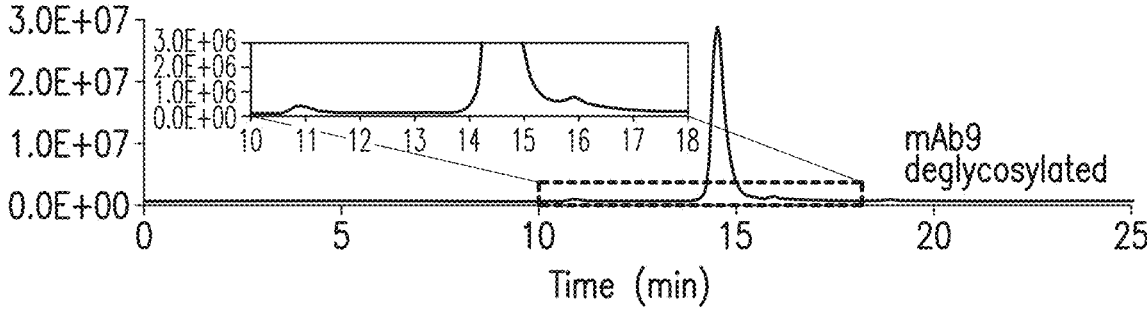
Figure 13B:
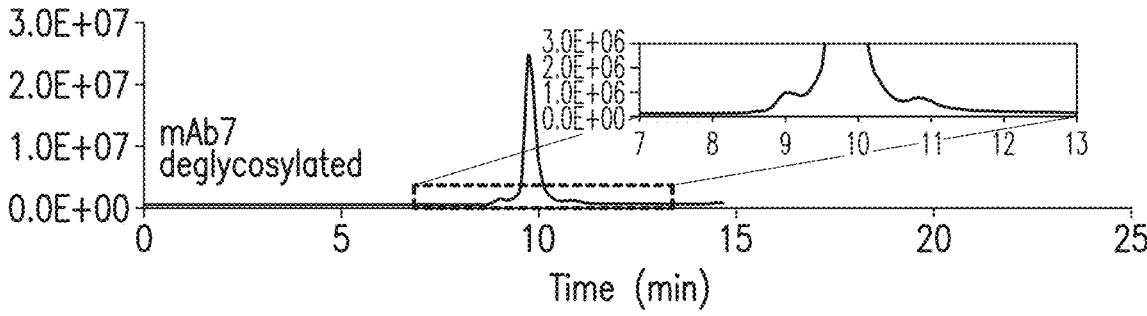

In the second test, by maintaining the flow rate at 0.4 mL/min and changing ammonium acetate concentrations in the mobile phase, the platform's tolerance towards salt concentrations was also evaluated using the same desalting SEC-MS method. For practical considerations, ammonium acetate concentrations ranging from 150 mM to 600 mM were studied for the impact on both MS sensitivity and spectrum quality. As shown in FIG. 9A, high MS intensity was consistently achieved over triplicate analyses of mAb1 at each salt concentration (150, 300, 450, and 600 mM). Although a noticeable decrease in MS intensity was observed along with the increase in salt concentration, presumably due to less efficient ionization at higher salt concentrations, the overall MS signal was still considered sufficient for most nLC-MS applications. Moreover, close examination of the native MS spectrum of mAb1 acquired at 600 mM salt concentration demonstrated excellent spectrum quality, with highly symmetric m/z peaks and good signal to noise ratio (FIG. 9B). Different glycoforms, resulting from the macro- and microheterogeneity of Fc N-glycosylation, can be well resolved and confidently assigned with good mass accuracy. Lastly, it is noteworthy that the evaluated ammonium acetate concentration range (150-600 mM) is sufficient in enabling most nLC-MS applications, such as nIEX-MS and nSEC-MS, most of which were developed and reported using mobile phases containing 20-200 mM of ammonium-based salts. To enable nHIC-MS analysis using salt concentrations within the tested range, a makeup and splitting flow strategy, as recently introduced by our group, 34 could be applied. Briefly, by introducing a diluent flow (water) post-column, the HIC mobile phases (up to 3 M ammonium acetate) can be diluted by six-fold (up to 500 mM) prior to native MS detection. Applying this strategy, nHIC-MS analysis of multiple mAb samples were performed on this platform, and high-quality data were consistently obtained (FIGS. 13A and 13B). Therefore, the developed nLC-MS platform can be versatilely applied to support most nLC-MS applications.

Figure 10A:
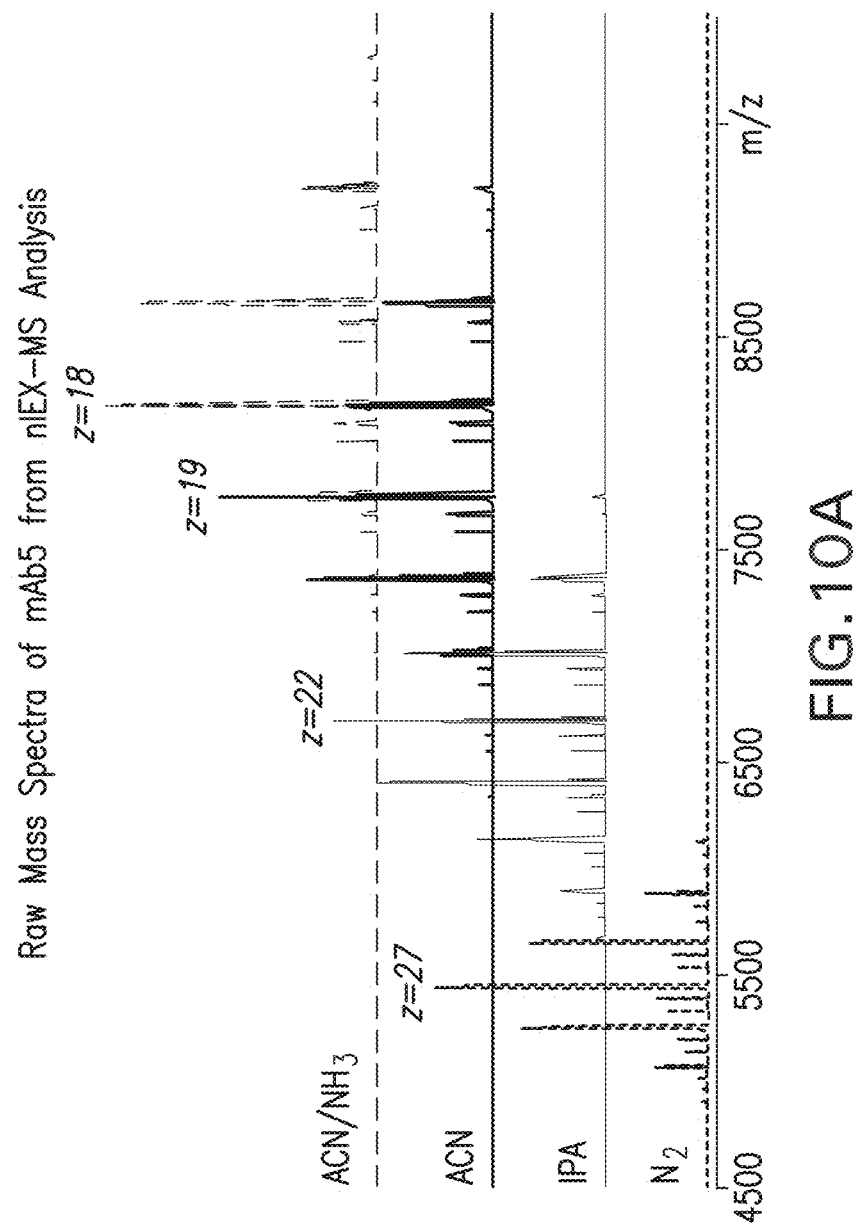
FIG. 10A shows representative native mass spectra of mAb5 obtained under different charge reduction conditions.
Figure 10B:
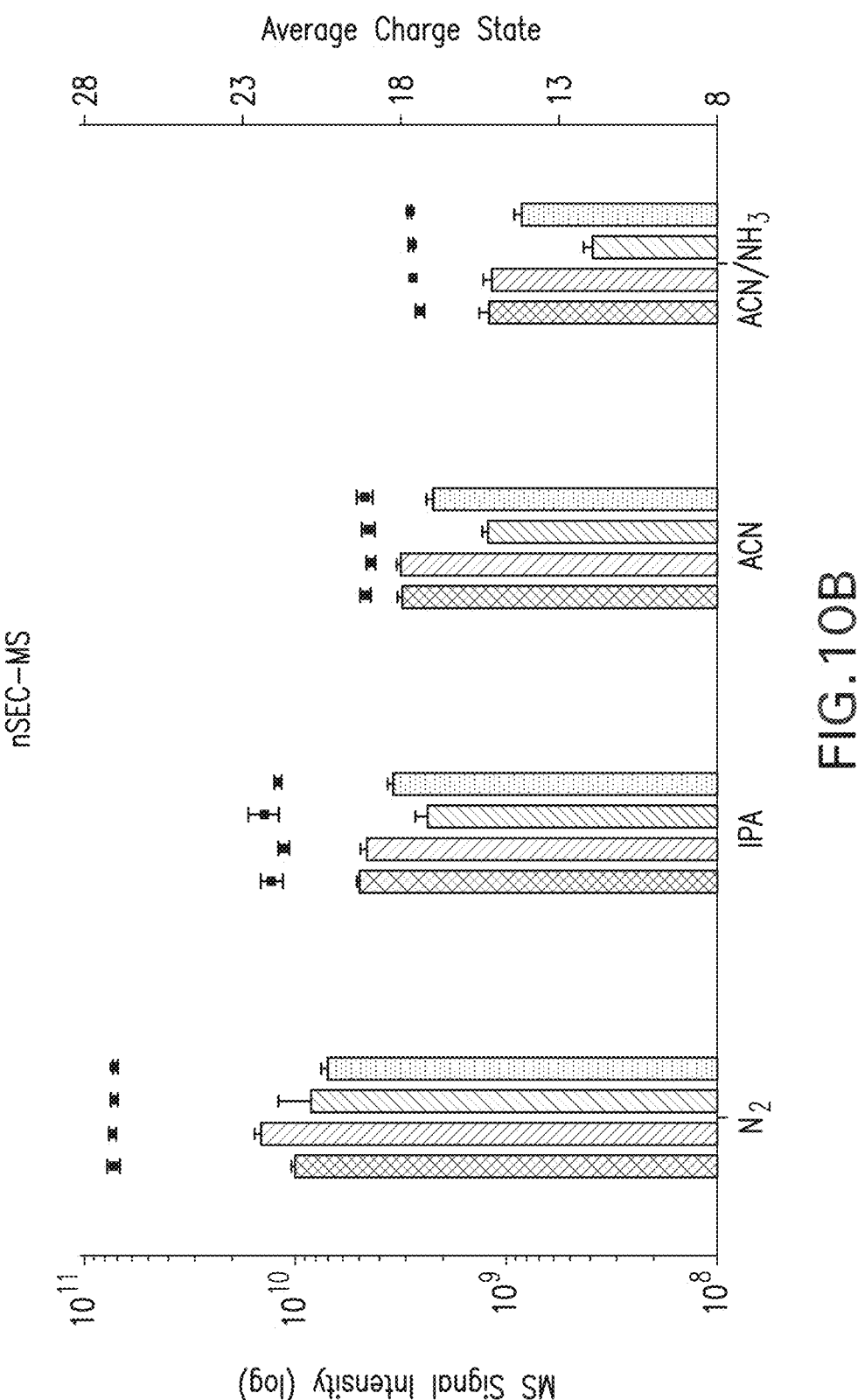
FIGS. 10B and 10C show evaluation of different organic modifiers for online charge reduction ability by performing nSEC-MS and nIEX-MS analysis of a four-mAb mixture sample. The MS intensity (left y-axis) and average charge state (right y-axis) of each mAb molecule are measured in triplicate and plotted under each condition.
Figure 10C:
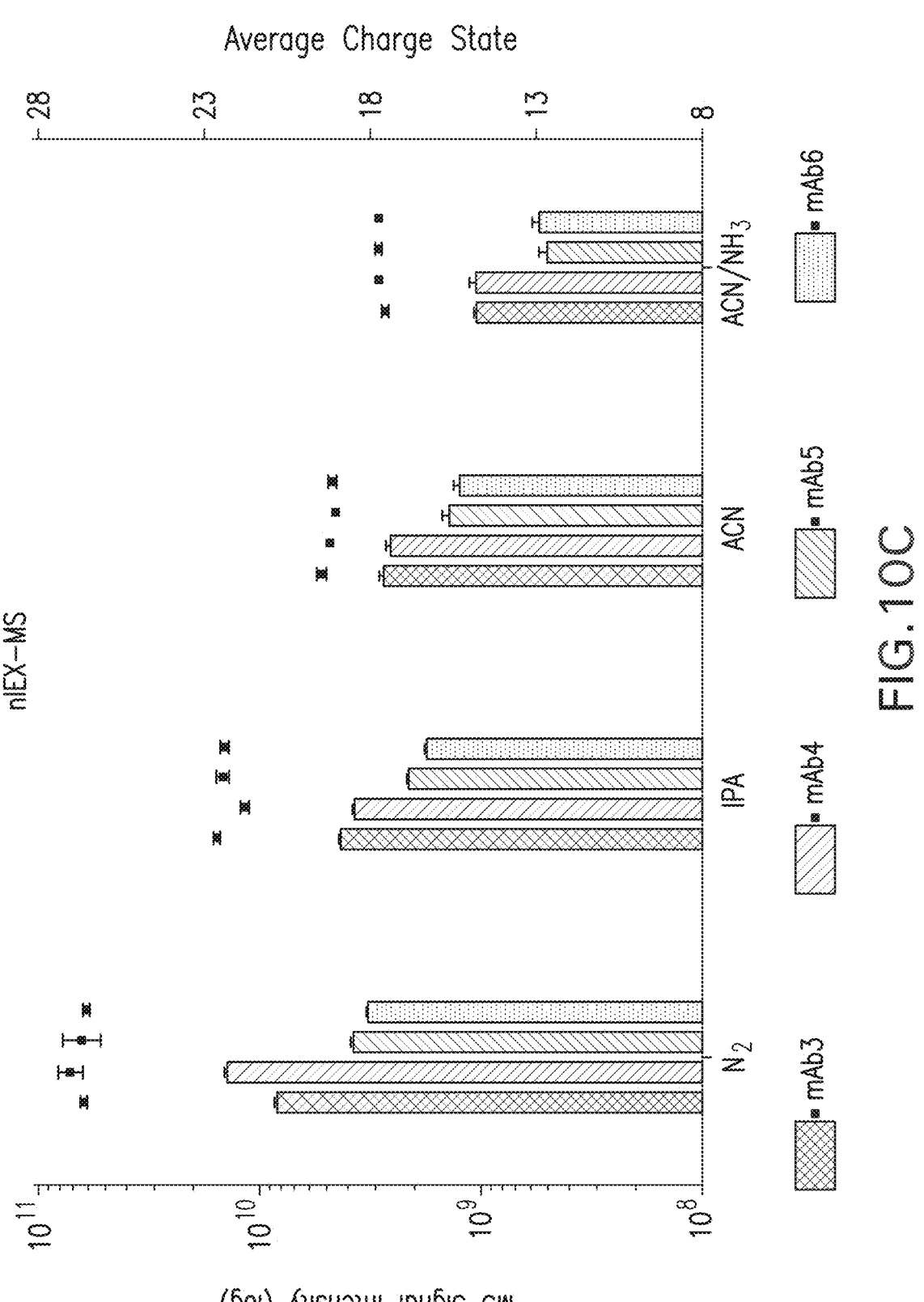

Platform Versatility for Online Charge Reduction Native MS Analysis. Charge reduction is a strategy frequently used to facilitate the native MS analysis of labile protein complexes or highly heterogeneous protein samples. Via charge reduction, non-covalent interactions present in protein complexes can be better preserved during native MS analysis due to reduced Coulombic repulsion. In addition, by shifting the charge state envelope toward a higher m/z region, the spatial resolution between adjacent charge states can be greatly improved, and therefore reducing the spectrum complexity. The most common approach to enable charge reduction native MS is by adding charge reducing reagents, such as imidazole or triethylamine (TEA), into the bulk analyte solution prior to ESI. Using this developed nLC-MS platform, charge reduction native MS can be readily achieved online by doping the desolvation gas with a variety of organic modifiers. To evaluate the charge reducing effects of three different modifiers (IPA, ACN and 5% (v/v) ammonia in ACN), a mixture of four different mAbs with pI ranging from 6.8 to 8.5 were analyzed by both nSEC-MS and nIEX-MS analyses with do-pant-modified desolvation gas. Subsequently, the average charge state of each mAb under each charge reduction condition was calculated and compared with that from the control experiments, which were performed using unmodified nitrogen as desolvation gas (FIGS. 10A-10C). The study demonstrated that, regardless of the mAb analytes (e.g., different pI), the solvent conditions for NSI (e.g., different pH and salt concentration from IEX gradient), or the nLC methods (e.g., SEC vs IEX), a consistent order of charge reducing capability was observed, with ACN/NH3 (5% ammonia in ACN) resulting in the greatest extend of charge reduction (~9.5 charges), followed by ACN (~8 charges) and IPA (~5 charges).

Figure 14A:
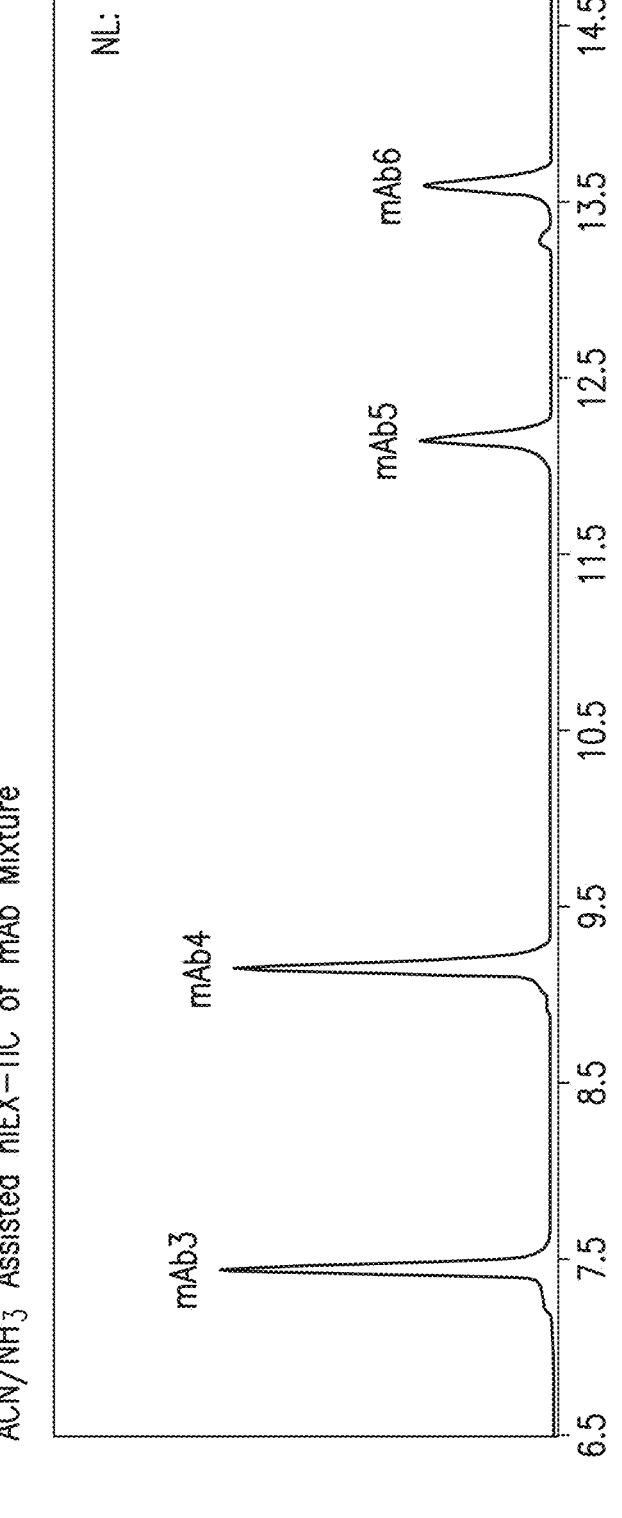
FIGS. 14A, 14B and 14C show ACN/NH3 Assisted nIEX-MS Analysis of mAb mixture showing (FIG. 14A) nIEX-TIC, (FIG. 14B) raw mass spectra of the main peaks of each mAb and (FIG. 14C) zoomed-in view of z=7 from the raw mass spectra.
Figures 14B, 14C:
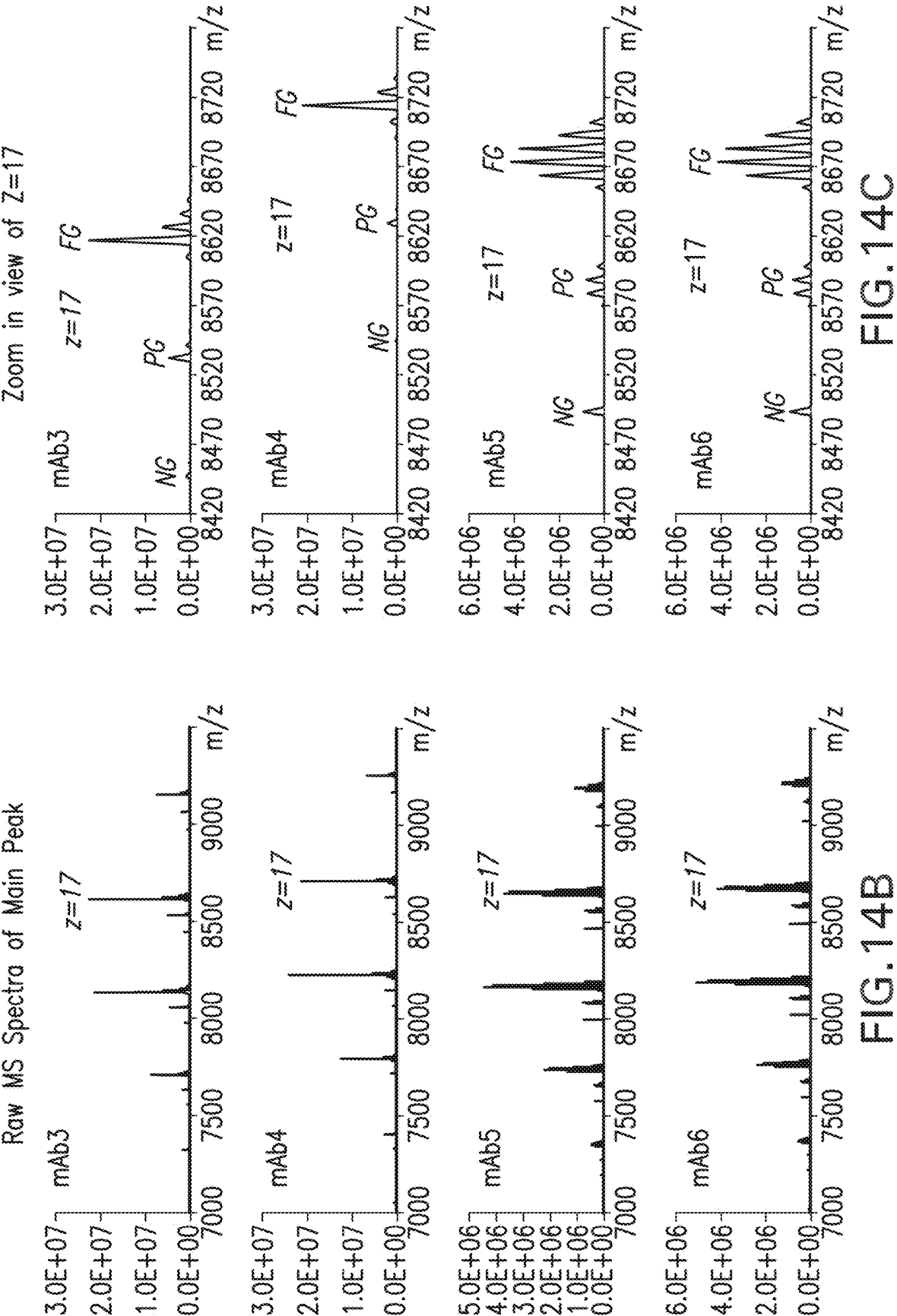
Figure 15:
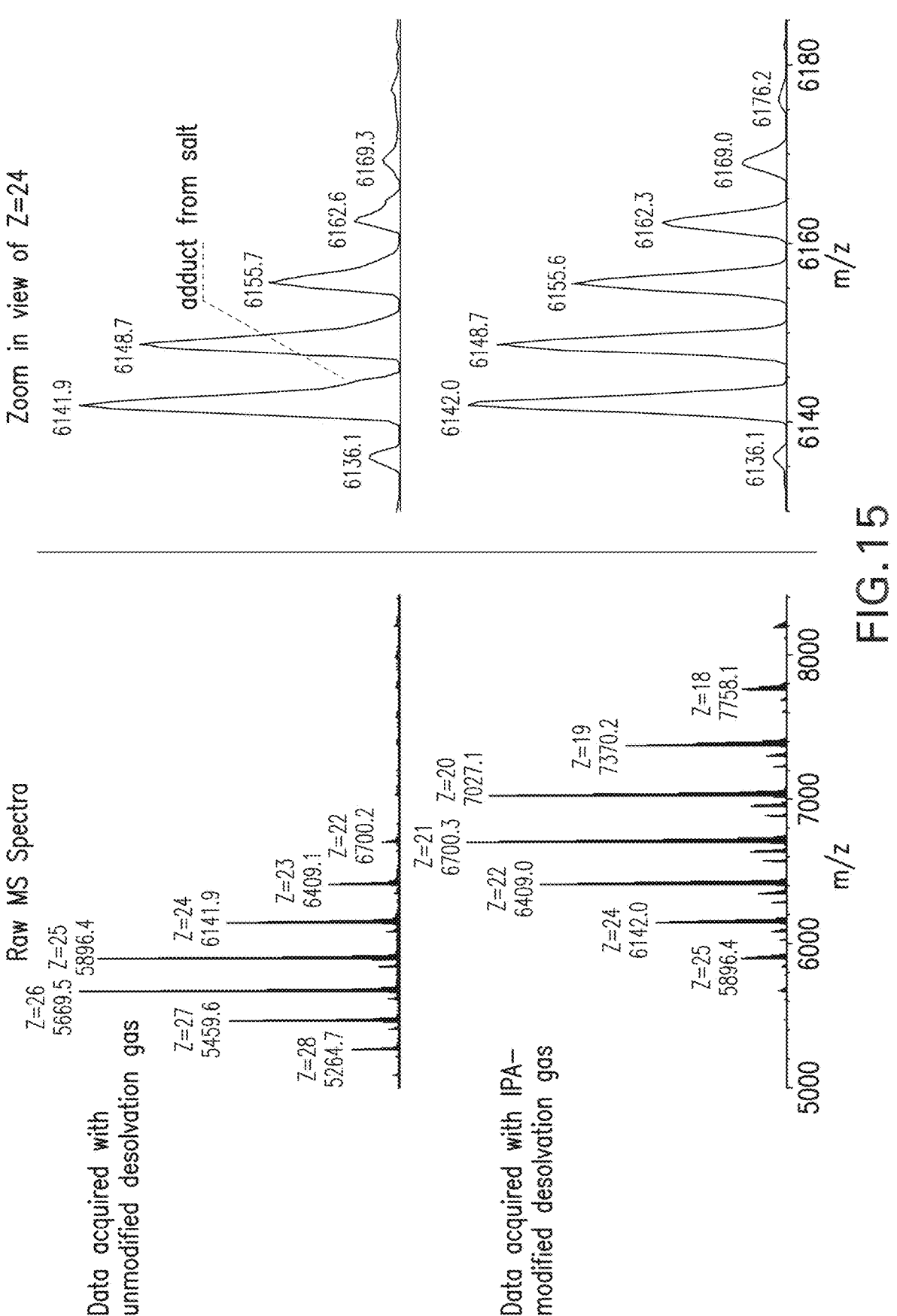
FIG. 15 shows native mass spectra of mAb2 acquired on the nLC-MS platform after prolonged analysis (>24 hours) using unmodified desolvation gas (top panel) or IPA-modified desolvation gas (bottom panel).

Charge reduction also led to a corresponding decrease in overall MS intensity (FIG. 10A-10C), which was likely attributed to less efficient transmission and detection of larger m/z ions by Orbitrap instrument. Nevertheless, even under the greatest charge reduction conditions, as achieved by ACN/NH3-modified desolvation gas, the overall MS intensity from analyses of 5 μg of mAb samples could still reach E8 levels with high quality MS spectra (FIGS. 14A-14C). It is worth noting that, unlike TEA that is difficult to remove once introduced to MS instruments, charge reduction by this approach is considered completely contamination-free. Interestingly, it was found that modifying desolvation gas with IPA or ACN could also improve desolvation efficiency during NSI, hence minimizing adduct formation which tend to form over extended analysis, resulting in improved spectrum quality (FIG. 15) and greater long-term spray stability. Therefore, the mildest charge reducing modifier, IPA, was applied by default for all nLC-MS applications on this platform.

Figure 11:
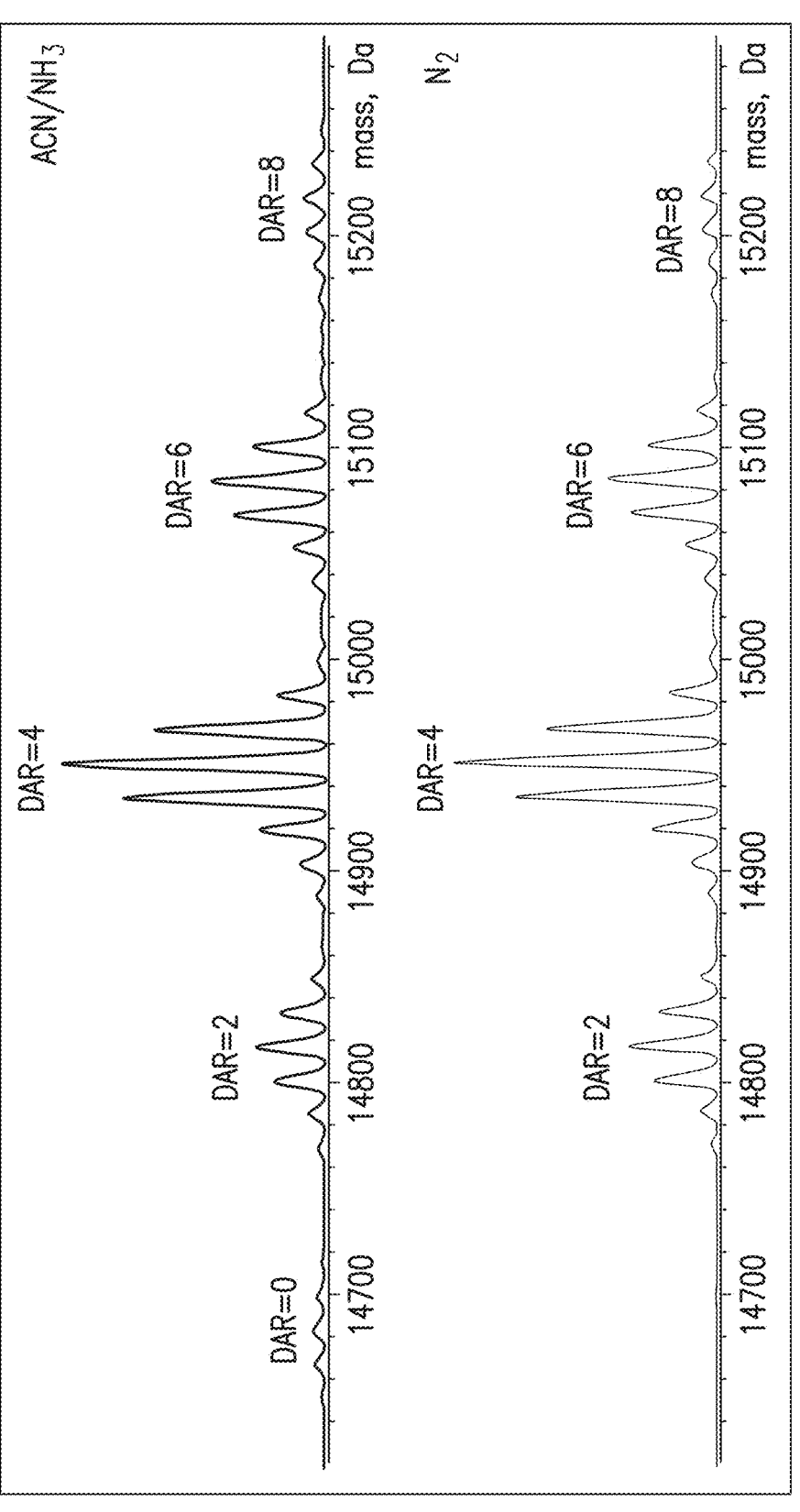
FIG. 11 shows deconvoluted mass spectra.

The ability to achieve online charge reduction native MS is valuable for the analysis of labile and/or heterogeneous protein drugs. For example, Cys-linked antibody-drug conjugates (ADCs) often present challenges for intact protein analysis because of their instability in gas phase due to the lack of interchain disulfide bonds, as well as the high mass heterogeneity arising from the different number of payloads. Using SigmaMab ADC mimic as a model system, the advantages of applying online charge reduction for native MS analysis of Cys-linked ADCs was evaluated (FIGS. 6 and 11). This ADC mimic consists of a mixture of drug-loaded species with 0 to 4 pairs of payloads (~668 Da) conjugated at inter-chain disulfide bond Cys residues from an IgG1 mAb. Without removing the Fc N-glycosylation from the molecule, nSEC-MS analyses were performed with and without online charge reduction. It was shown that when analyzed without charge reduction, dissociation of the non-covalent ADC complex was readily observed even with minimal in-source energy (SID=50 eV) applied, leading to the formation of a highly charged light chain (LC) species and a charge-striped H2L species (FIG. 6). In contrast, when ACN/NH3-assisted charge reduction was applied, such dissociation events were dramatically reduced even with a higher in-source energy applied (SID=100 eV, optimized for efficient desolvation) (FIG. 6). By calculating the relative MS intensity of LC against the intact ADC, this dissociation propensity was estimated to be reduced from 8.3% to 0.4% upon charge reduction. This increased stability of ADC complex in gas phase is likely attributed to the reduced Coulombic repulsion at lower charge states, as well as the decreased internal energy of the ions through evaporative cooling (by charge reducing reagents). Moreover, because of the increased mass heterogeneity introduced by different number of payloads, without charge reduction, the charge state envelopes of different DAR (drug-to-antibody ratio) species overlapped in certain m/z regions. For example, charge states of +30, +29 and +28 from DAR8 species showed up in similar m/z regions as charge states of +29, +28 and +27 from DAR0 species, respectively (FIG. 6). Such m/z overlapping could cause difficulty for spectral deconvolution, in which case, the DAR0 species were not detected after deconvolution (FIG. 11, bottom panel). In contrast, with ACN/NH3-assisted charge reduction, the entire charge state envelope was shifted to higher m/z regions where the spatial resolution between adjacent charge states was greatly improved. As a result, no overlapping between charge states from different DAR species (e.g. z=+20 from DAR8 and z=+19 from DAR0) was observed (FIG. 6), facilitating confident spectral deconvolution (FIG. 11, top panel). For Cys-linked ADCs, in order to accurately measure the average DAR and characterize the payload distribution, minimizing the undesired chain dissociation and spectral overlapping are both important. Chain dissociation in gas phase will likely lead to underestimation of the average DAR due to preferential dissociation of the high DAR species. Spectral overlapping will lead to ambiguity or even loss of information during deconvolution. In this example, although the average DAR values obtained under the two conditions were comparable (DAR=4.3 from charge reduction method vs DAR=4.2 from control method), the payload distributions were different. Without charge reduction, the DAR0 species was not observed after deconvolution, while the relative abundances of the high DAR species were underestimated due to their preferential dissociation. Those two causes affected the average DAR calculation in opposite directions and led to a comparable average DAR. However, only under the charge reduction conditions, both the average DAR and the payload distribution of this Cys-ADC mimic was accurately characterized.

Figure 2:
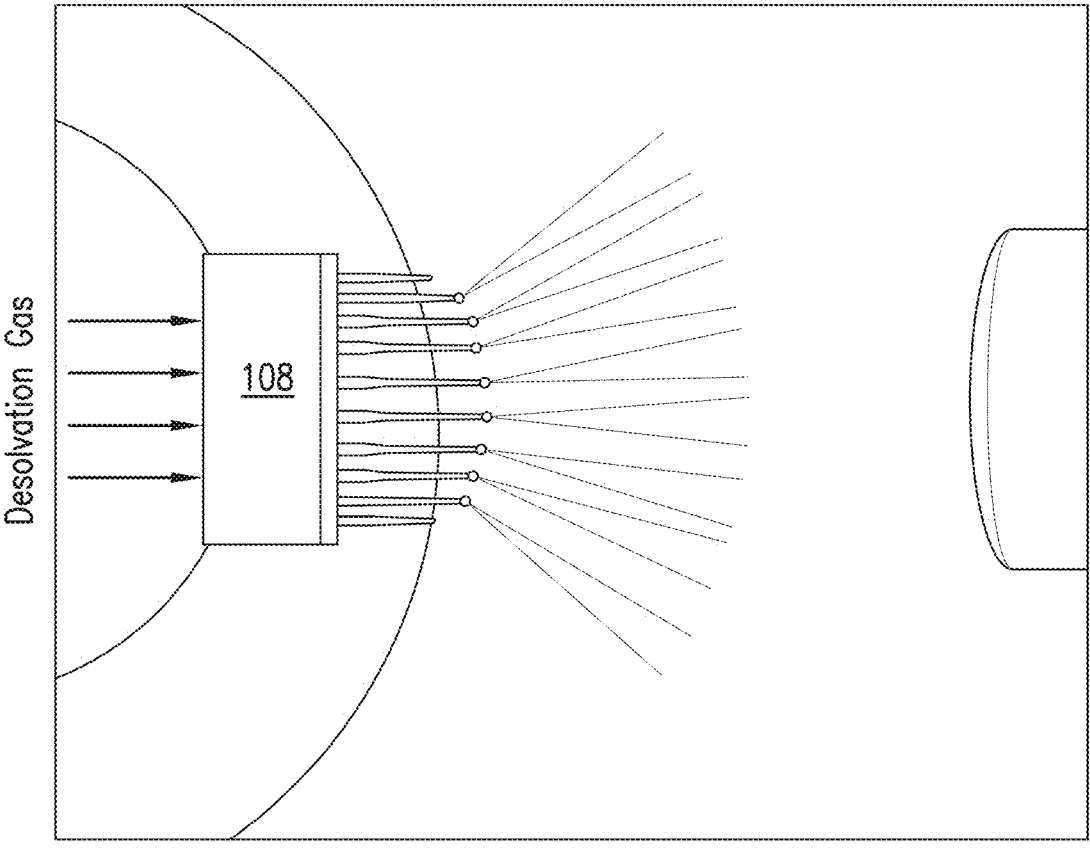
FIG. 2 shows a microfabricated monolithic multinozzle (M3) emitter which is utilized in an embodiment of a native LC-MS platform disclosed herein.
Figures 1, 16:
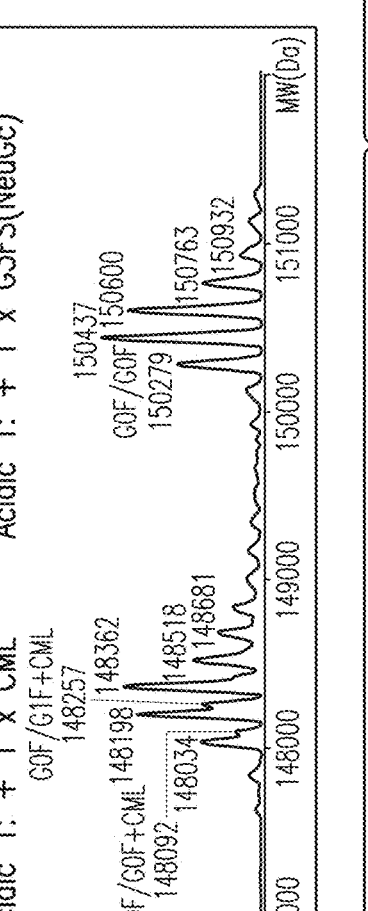
Figures 2, 16:
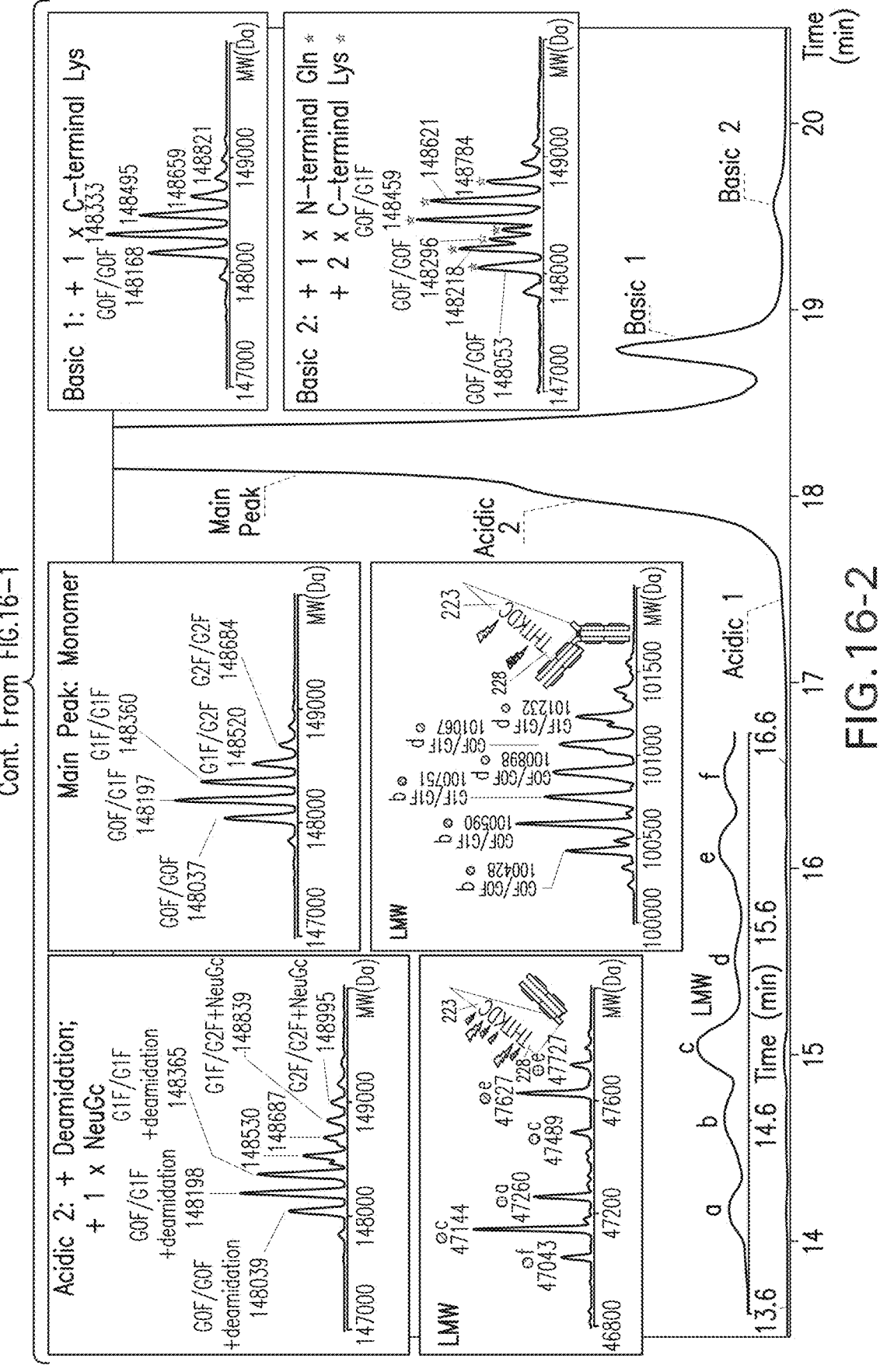

Platform Sensitivity and Dynamic Range. In-depth characterization of protein drug heterogeneity requires both high sensitivity and large dynamic range from the analytical methods. The former allows the characterization to be achieved with minimal sample consumption, while the latter enables the identification of those low-abundance variants. To evaluate the sensitivity and dynamic range of the developed nLC-MS platform, NISTmAb reference standard was used as a testing article and subjected to both nSEC-MS and nIEX-MS analyses. Without any sample treatment, 10 μg of NISTmAb was injected onto a Waters BEH200 SEC column (4.6 mm×300 mm) followed by IPA-assisted native MS analysis. The TIC from the nSEC-MS analysis revealed two high molecular weight (HMW) peaks and two low molecular weight (LMVV) peaks that were separated or partially separated from the main peak (FIG. 3). The main peak, detected at total ion intensity of ~1E9, was attributed to NISTmAb monomer. HMW Peak 1 and HMW Peak 2, present at ~0.1% and ~1.3% respectively, based on UV-based quantitation, were both assigned as dimeric forms of NISTmAb, which were presumably separated by SEC due to their different conformations. Notably, even at such low levels, high-quality MS data were obtained for these two dimeric species, exhibiting glycoform-resolved mass peaks after deconvolution (FIG. 3, insets). In addition, two LMW peaks also exhibited excellent spectrum quality and were unambiguously identified as two complementary fragments resulting from a series of clipping events occurring at the upper hinge region (FIG. 3, insets). Subsequently, nIEX-MS analysis of 10 µg of untreated NISTmAb was carried out by adopting a reported strong cation exchange method into this nLC-MS platform. Multiple charge variant species present at very different levels, including the same truncated mAb fragments, were all confidently identified based on high-quality MS data (FIGS. 16-1 and 16-2). Finally, the size and charge variants in NISTmAb, as identified by these two nLC-MS methods, were all summarized in FIG. 18, with their relative abundances quantified by corresponding UV peaks. As minor species could be readily detected at levels down to ~0.02%, a dynamic range of approximately four orders of magnitude could be achieved by applying both nSEC-MS and nIEX-MS methods on this developed nLC-MS platform with an injection amount of 10 µg NISTmAb. Finally, as 0.02% of minor species from a 10 µg injection represented an absolute quantity of 2 ng on column, this platform was also considered highly sensitive and might be valuable for MS-based bioanalysis applications.

Platform Robustness. Robustness is another major consideration when developing analytical methods for routine applications in industrial laboratories. Particularly, nLC-MS methods continuously introduce aqueous salt solutions into the MS ion source, leading to difficulties in maintaining spray stability and signal intensity over extended analysis time. To evaluate if the developed nLC-MS platform can be applied to continuous analysis and if the spray stability and method sensitivity can be maintained over a long period of time, both nSEC-MS and nIEX-MS analysis of mAb molecules were repeatedly performed over 24 hours, generating more than 50 runs each. As shown in FIG. 17, good signal intensity and stability were achieved over 24 hours, with CV values at 6.0% and 4.1% for nSEC-MS and nIEX-MS analyses, respectively. The high robustness achieved by this nLC-MS platform is likely attributed to both the application of the multi-nozzle emitter and the IPA-assisted native MS. The former not only reduces the size of droplets introduced to NSI, but also mitigates the risk of clogging from protein precipitation and accumulation. The IPA-assisted native MS further improves the desolvation efficiency, likely by reducing the surface tension of the droplets.

CONCLUSIONS

Developing a nLC-MS platform suitable for industrial laboratory applications is of great interest to the biopharmaceutical community, due to the increasing interest and demand in applying various nLC-MS methods for protein drug characterization. In this example, the development of a novel nLC-MS platform that can be easily integrated with various nLC methods and features great versatility, sensitivity, and robustness is disclosed. Via innovative designs, it was demonstrated that the developed platform could handle a wide range of LC flow rates (0.1 to 0.8 mL/min) and tolerate high salt concentrations (up to 600 mM in mobile phase), which together contributed to the achieved versatility in accommodating various nLC methods. It was then explored different dopant-modified desolvation gas to achieve online charge reduction native MS on this platform. Subsequently, a case study of a Cys-linked ADC mimic showcased the suitability and advantages of applying charge reduction native MS for characterizing labile and/or heterogeneous protein molecules. In addition, in-depth characterization of the size and charge heterogeneity of NISTmAb was achieved by both nSEC-MS and nIEX-MS analyses using this platform and demonstrated large dynamic range and great sensitivity. Furthermore, this nLC-MS platform was also proved to be highly robust and thus suitable for continuous analysis over extended time (>24 hours). Finally, the present platform was built with all commercially available parts and therefore can be readily implemented by other laboratories for consistent performance.

Overall, as demonstrated here for analysis of monoclonal antibody samples in different case studies, the developed approach provides a more efficient way compared with the conventional approach to better support ever-increasing demands for monoclonal antibody characterization at different stages of the drug development.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A native liquid chromatography-mass spectrometry system, comprising:
    a liquid chromatography system capable of separating a sample; and
    an electrospray ionization mass spectrometry (ESI-MS) system in fluid communication with the liquid chromatography system, wherein the ESI-MS system comprises a multi-nozzle electrospray ionization emitter, a system for modifying a desolvation gas, wherein the desolvation gas is modified with about 5% ammonia in acetonitrile, and a mass spectrometer, wherein the mass spectrometer is configured to receive ions and characterize mass to charge ratio of ions.

2. The native liquid chromatography-mass spectrometry system of claim 1, wherein the system for modifying a desolvation gas comprises a container having a cap and comprising an organic solvent and an additional chemical component comprising an acid or a base, wherein the cap has an inlet line port and an outlet line port; a sheath gas inlet line for providing a sheath gas to the inlet line port; and a modified desolvation gas outlet line capable of connecting the outlet line port to the multi-nozzle electrospray ionization emitter.

3. The native liquid chromatography-mass spectrometry system of claim 2, wherein the acid is trifluoroacetic acid and wherein the base is triethylamine.

4. The native liquid chromatography-mass spectrometry system of claim 2, wherein the sheath gas is nitrogen.

5. The native liquid chromatography-mass spectrometry system of claim 2, wherein the sheath gas inlet line is partially inserted into to the inlet line port;
    wherein the modified desolvation gas outlet line is partially inserted into to the outlet line port; and

wherein the sheath gas flows from the sheath gas inlet line through the container containing the organic solvent into the modified desolvation gas outlet line.

6. The native liquid chromatography-mass spectrometry system of claim 1, wherein the multi-nozzle electrospray ionization emitter includes eight nozzles.

7. The native liquid chromatography-mass spectrometry system of claim 1, wherein the liquid chromatography system comprises a size exclusion chromatography (SEC) column or an ion exchange chromatography (IEX) column.

8. The native liquid chromatography-mass spectrometry system of claim 1, wherein the native liquid chromatography-mass spectrometry system further comprises an analytical flow splitter for adjusting flow rate from the liquid chromatography system to the mass spectrometer, wherein the analytical flow splitter is capable of providing an electrospray with a solvent flow rate of about 1 to 5 µL/min.

9. The native liquid chromatography-mass spectrometry system of claim 1, wherein the mass spectrometer comprises an ion trap mass analyzer.

10. A method of characterizing a non-reduced intact protein in a sample, comprising:

supplying the sample to a native liquid chromatography system capable of sample separation and fragmentation to obtain a fragment sample, the liquid chromatography system comprising a size exclusion chromatography system (SEC) column or an ion exchange chromatography (IEX) column;

analyzing the fragmented sample by use of an electrospray ionization mass spectrometry (ESI-MS) system in fluid communication with the liquid chromatography system, wherein the ESI-MS system comprises a multi-nozzle electrospray ionization emitter, a system for modifying a desolvation gas, wherein the desolvation gas is modified with about 5% ammonia in acetonitrile, and a mass spectrometer, wherein the mass spectrometer is configured to receive ions and characterize mass to charge ratio of ions to identify components of the protein to characterize the protein; and

wherein the method does not require deglycosylation of the protein in the sample prior to supplying the sample to the liquid chromatography system.

11. The method of claim 10, wherein the protein is an antibody, a fusion protein, recombinant protein, or a combination thereof.

12. The method of claim 11, wherein the antibody is a monoclonal antibody of isotype IgG1, IgG2, IgG3, IgG4, or mixed isotype.

13. The method of claim 10, wherein the system for modifying a desolvation gas comprises a container having a cap, the container comprising an organic solvent and an additional chemical component comprising an acid or a base, wherein the cap has an inlet line port and an outlet line port; a sheath gas inlet line for providing a sheath gas to the inlet line port; and a modified desolvation gas outlet line capable of connecting the outlet line port to the multi-nozzle electrospray ionization emitter.

14. The method of claim 13, wherein the acid is trifluoroacetic acid and wherein the base is triethylamine.

15. The method of claim 13, wherein the organic solvent is acetonitrile and/or wherein the sheath gas is nitrogen.

16. The method of claim 13, wherein the sheath gas inlet line is partially inserted into to the inlet line port;

wherein the modified desolvation gas outlet line is partially inserted into to the outlet line port; and wherein the sheath gas flows from the sheath gas inlet line through the container containing the organic solvent into the modified desolvation gas outlet line.

17. The method of claim 10, wherein the multi-nozzle electrospray ionization emitter includes eight nozzles.

18. The method of claim 10, further comprising an analytical flow splitter for adjusting flow rate from the liquid chromatograph system to the mass spectrometer, wherein the analytical flow splitter is capable of providing an electrospray with a solvent flow rate of about 1 to 5 µL/min.

19. The method of claim 10, wherein the mass spectrometer comprises an ion trap mass analyzer.

* * * * *